US011577328B1

(12) United States Patent
Matson et al.

(10) Patent No.: US 11,577,328 B1
(45) Date of Patent: Feb. 14, 2023

(54) DUST COLLECTION SYSTEMS AND ATTACHMENTS FOR CIRCULAR SAWS

(71) Applicants: Russell Matson, Ralston, NE (US); Warren Matson, Omaha, NE (US)

(72) Inventors: Russell Matson, Ralston, NE (US); Warren Matson, Omaha, NE (US)

(*) Notice: Subject to any disclaimer, the term of this patent is extended or adjusted under 35 U.S.C. 154(b) by 0 days.

(21) Appl. No.: 17/391,409

(22) Filed: Aug. 2, 2021

Related U.S. Application Data

(62) Division of application No. 16/505,866, filed on Jul. 9, 2019, now Pat. No. 11,077,507.

(60) Provisional application No. 62/695,296, filed on Jul. 9, 2018.

(51) Int. Cl.
*B26D 7/18* (2006.01)
*B26D 7/27* (2006.01)
*B23D 59/00* (2006.01)
*B23D 45/16* (2006.01)

(52) U.S. Cl.
CPC ............ *B23D 59/006* (2013.01); *B23D 45/16* (2013.01)

(58) Field of Classification Search
CPC B23D 59/006; B23Q 11/005; B23Q 17/2404; B23Q 11/0042; B23Q 11/0046; B27B 9/00; B26D 7/08; B26D 7/18; B26D 7/1854; B26D 7/27; B27G 19/04; Y10T 83/242; Y10T 83/207; Y10T 83/2216; B24B 55/102
USPC ......... 30/124, 125, 516, 293, 390, 391, 376, 30/377, 388, 389, 374, 134, 194; 83/168, 83/98, 99, 169, 100; D8/14.1, 61–71, 90, D8/363; D15/124–126, 133, 138–140; 144/252.1; 451/356, 357, 351, 164
See application file for complete search history.

(56) References Cited

U.S. PATENT DOCUMENTS 3,673,744 A * 7/1972 Oimoen ............... B24B 55/102
                                                451/353
3,882,598 A    5/1975 Earle et al.
4,782,632 A * 11/1988 Matechuk ............... B24B 7/184
                                                451/354
D376,526 S   12/1996 Hepburn
(Continued)

OTHER PUBLICATIONS

Dustless Technologies D4000 7 Worm Drive Saw Shroud, Tool Fetch, toolfetch.com, Oct. 11, 2018, 1 page.
(Continued)

*Primary Examiner* — Ghassem Alie
(74) *Attorney, Agent, or Firm* — Erik M. Antonson; Advent, LLP

(57) ABSTRACT

A dust collection system for a circular saw may include an attachment. A fixed blade guard may define an exhaust port for removing debris drawn into the fixed blade guard. An attachment may be positioned adjacent to a fixed blade guard in fluid communication with an interior of the fixed blade guard through an aperture, where the attachment defines an exhaust port. An exhaust port can extend into fluid communication with a cavity formed by a protrusion, where the cavity has an expanded interior volume extending from and adjacent to the exhaust port. A channel defined by a connection configured for connecting to a vacuum source is in fluid communication with the expanded interior volume of the cavity through the exhaust port for pulling debris from within the fixed blade guard into the cavity and through the exhaust port and the channel toward the vacuum source.

17 Claims, 30 Drawing Sheets

(56) References Cited

U.S. PATENT DOCUMENTS

| | | | |
|---|---|---|---|
| D407,094 S | 3/1999 | Meredith et al. | |
| D407,617 S | 4/1999 | Cooper et al. | |
| 6,004,197 A * | 12/1999 | Huber | B24B 23/026 |
| | | | 451/357 |
| D435,259 S | 12/2000 | Brickner, Jr. et al. | |
| 6,546,631 B2 | 4/2003 | Iida et al. | |
| 7,465,328 B2 | 12/2008 | Trautner et al. | |
| 7,526,866 B2 | 5/2009 | Schnell et al. | |
| 7,562,456 B2 | 7/2009 | Roehm et al. | |
| D604,828 S | 11/2009 | Krohmer et al. | |
| 7,644,645 B2 | 1/2010 | Gass et al. | |
| D614,678 S | 4/2010 | Jorgensen et al. | |
| 8,061,044 B2 | 11/2011 | Saitoh | |
| 8,137,165 B2 * | 3/2012 | Loveless | B24B 55/102 |
| | | | 451/454 |
| D659,922 S | 5/2012 | Krohmer et al. | |
| D677,547 S | 3/2013 | Rosenau et al. | |
| D677,548 S | 3/2013 | Rosenau et al. | |
| D677,549 S | 3/2013 | Baron et al. | |
| D678,028 S | 3/2013 | Rosenau et al. | |
| D683,918 S | 6/2013 | Erlich et al. | |
| D695,584 S | 12/2013 | Chen | |
| D703,401 S | 4/2014 | Hill | |
| 8,857,067 B2 * | 10/2014 | Moreno | B23Q 5/027 |
| | | | 30/388 |
| D719,806 S | 12/2014 | Wiedemann | |
| 9,033,769 B2 * | 5/2015 | Mizutani | B23Q 11/0046 |
| | | | 451/456 |
| D736,582 S | 8/2015 | Dietsche | |
| D742,710 S | 11/2015 | Wiedemann | |
| D743,230 S | 11/2015 | Wiedemann | |
| D795,317 S | 8/2017 | Wenning et al. | |
| D802,102 S | 11/2017 | Mursu et al. | |
| D803,916 S | 11/2017 | Dammkoehler et al. | |
| D816,453 S | 5/2018 | Hansen et al. | |
| D818,788 S | 5/2018 | Dammkoehler et al. | |
| 10,293,421 B2 | 5/2019 | Hansen et al. | |
| 2002/0152867 A1 | 10/2002 | Meredith et al. | |
| 2005/0103172 A1 * | 5/2005 | Bohne | B23D 59/006 |
| | | | 83/168 |
| 2006/0169111 A1 | 8/2006 | Kozlowski | |
| 2009/0183377 A1 | 7/2009 | Loveless et al. | |
| 2009/0205211 A1 | 8/2009 | Nickels, Jr. et al. | |
| 2010/0269654 A1 | 10/2010 | Needel et al. | |
| 2016/0016241 A1 * | 1/2016 | Taylor | B23Q 11/0067 |
| | | | 83/167 |
| 2016/0121513 A1 | 5/2016 | Mahoney | |
| 2016/0332244 A1 | 11/2016 | Koegel | |

OTHER PUBLICATIONS

Saw Muzzle, for Makita Hypoid Saws, Dust Collection Products and Services, Amazon.com, Oct. 11, 2018, 1 page.

Skilsaw, Google Express—Shopping; Google, Inc., express.google.com, Oct. 11, 2018, 1 page.

EZSMART Dust Port, Model: EZDP100, Tools & Hardware Store, Amazon.com, Oct. 11, 2018, 1 page.

* cited by examiner

US 11,577,328 B1

DUST COLLECTION SYSTEMS AND ATTACHMENTS FOR CIRCULAR SAWS

CROSS-REFERENCE TO RELATED APPLICATIONS

The present application is a divisional under 35 U.S.C. § 120 of U.S. patent application Ser. No. 16/505,866, filed Jul. 9, 2019, and titled "DUST COLLECTION SYSTEMS AND ATTACHMENTS FOR CIRCULAR SAWS," which itself claims the benefit under 35 U.S.C. § 119(e) of U.S. Provisional Application Ser. No. 62/695,296, filed Jul. 9, 2018, and titled "DUST COLLECTION SYSTEMS AND ATTACHMENTS FOR CIRCULAR SAWS." U.S. patent application Ser. No. 16/505,866 and U.S. Provisional Application Ser. No. 62/695,296 are herein incorporated by reference in their entireties.

BACKGROUND

Circular saws use toothed or abrasive discs or to cut material using a rotary motion, e.g., where a disc or blade spins about an arbor.

DRAWINGS

The Detailed Description is described with reference to the accompanying figures. The use of the same reference numbers in different instances in the description and the figures may indicate similar or identical items.

DETAILED DESCRIPTION

Figure 1:
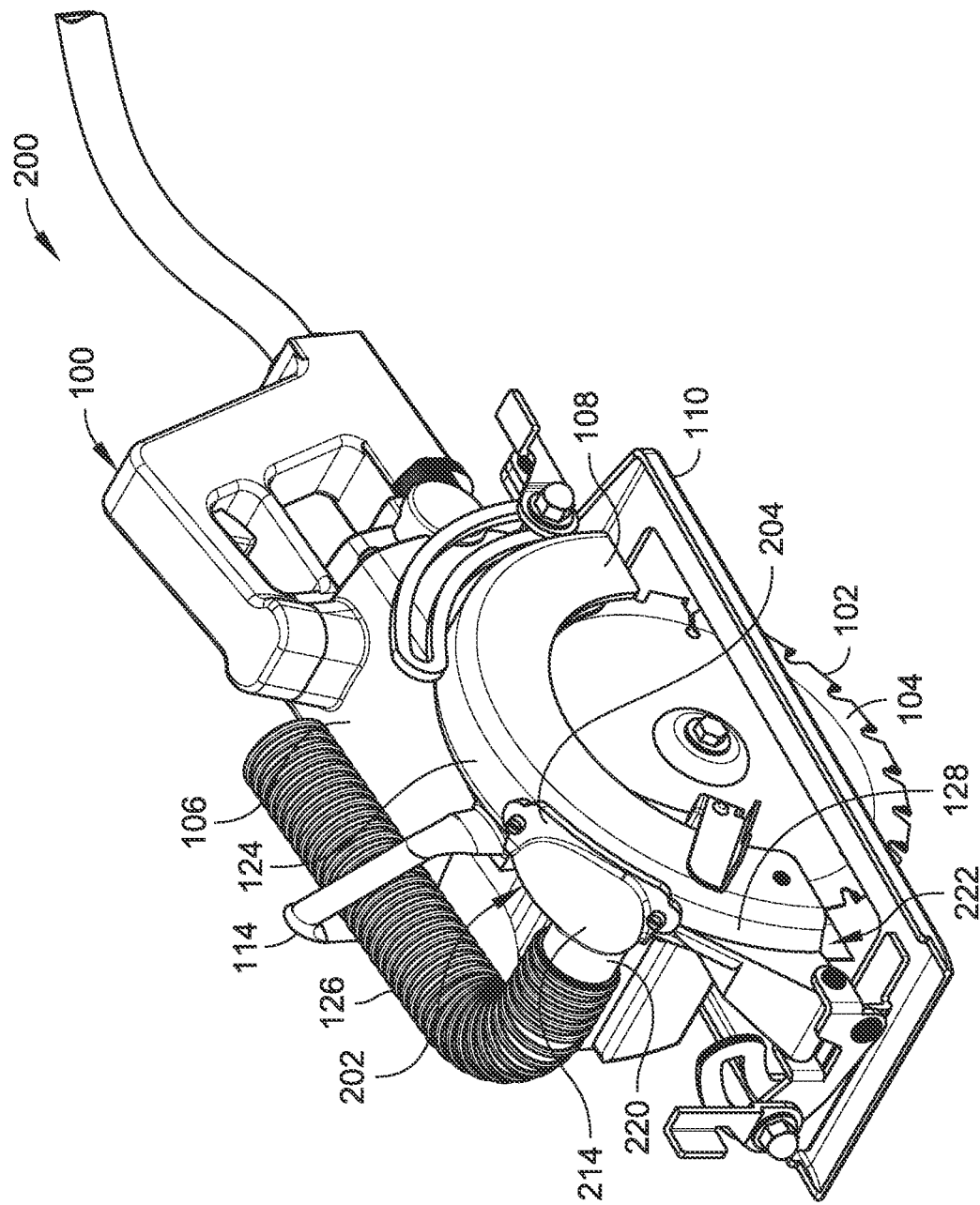
FIG. 1 is an isometric view illustrating a dust collection system including an attachment for a fixed blade guard of a circular saw in accordance with an example embodiment of the present disclosure.
Figure 2:
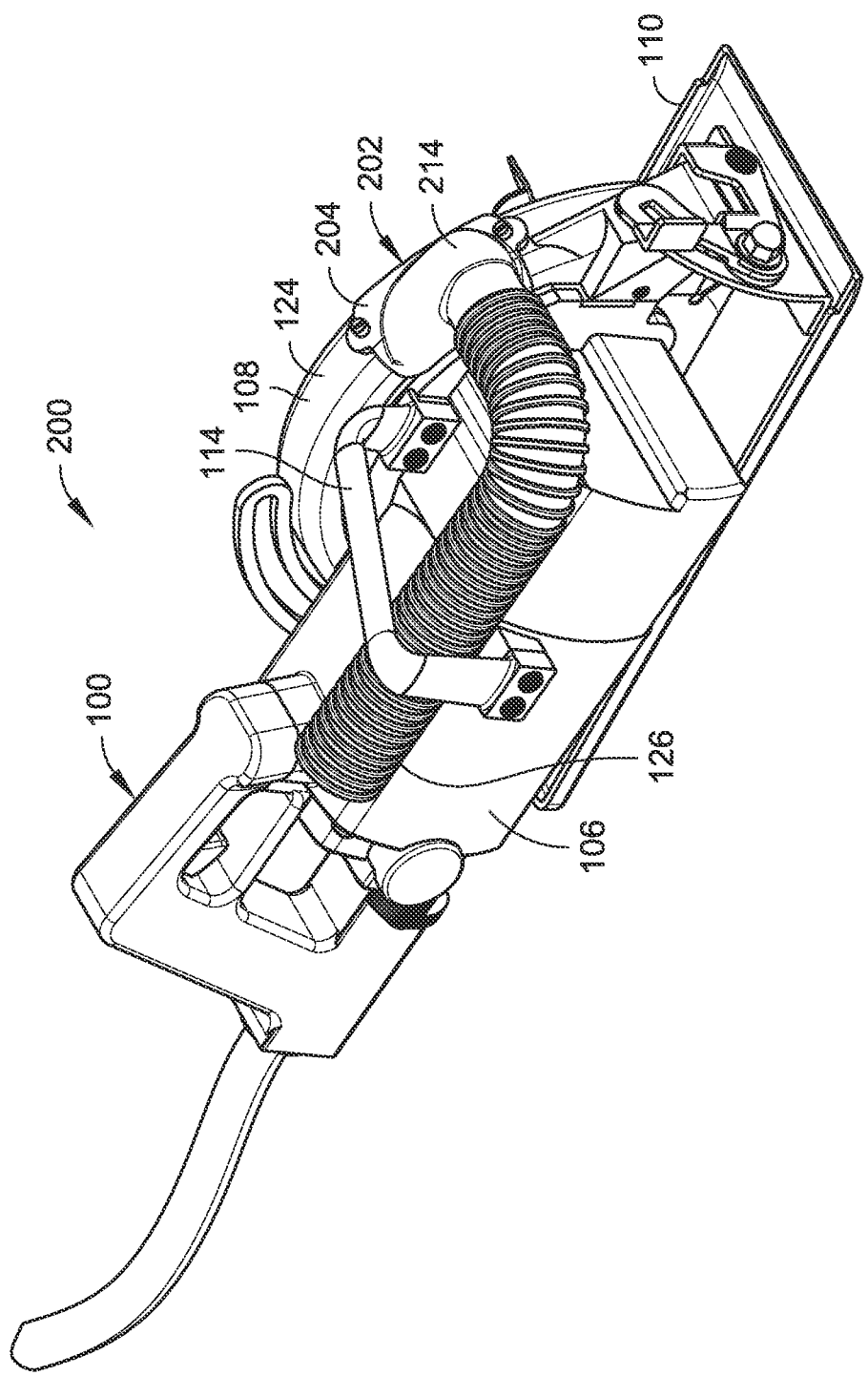
FIG. 2 is another isometric view of the dust collection system illustrated in FIG. 1.

Circular saws 100 use toothed or abrasive discs or blades 102 to cut material using a rotary motion, e.g., where a disc or blade spins about an arbor. In operation, material to be cut is securely held in place, and the saw blade 102 is moved across the material and/or into the material. In the case of a toothed blade 102, as each tooth 104 impacts the material to be cut, a small chip is created, which is then removed from the material by the teeth 104. In general, a circular saw 100 can generate a significant amount of dust and/or debris as material is cut.

Circular saw blades 102 can be driven by various arrangements of motors and gears. One type of circular saw 100 is a worm-drive circular saw 100, where perpendicularly mounted worm gears indirectly drive a saw blade 102 from a motor 106 mounted out of line with (e.g., perpendicular to) the saw's arbor mount 130. In a worm-drive saw arrangement, there may be limited space for dust and debris collection hardware. For example, the motor 106 may be immediately adjacent to a fixed blade guard 108 on one side of the blade 102, while mounting hardware for allowing the angle of the blade 102 to be changed with respect to a base plate 110 may be immediately adjacent to the fixed blade guard 108 on the other side of the blade 102. Additionally, a table guide may obstruct access to the fixed blade guard 108 from the rear of the saw (e.g., proximate to the motor 106).

The fixed blade guard 108 may be used with a moveable blade guard 112, where the two guards 108 and 112 cover the blade. Typically, the fixed blade guard 108 is rigidly attached to the motor 106 and a handle 114, while the moveable blade guard 112 can rotate about the center of the blade 102 and is normally held in an extended (e.g., lower) covering position by a biasing device, such as a spring. The moveable blade guard 112 fits within the fixed blade guard 108 and can be rotated into a retracted (e.g., upper) position within the fixed blade guard 108 to allow the circular saw 100 to be employed for cutting material.

Figure 3:
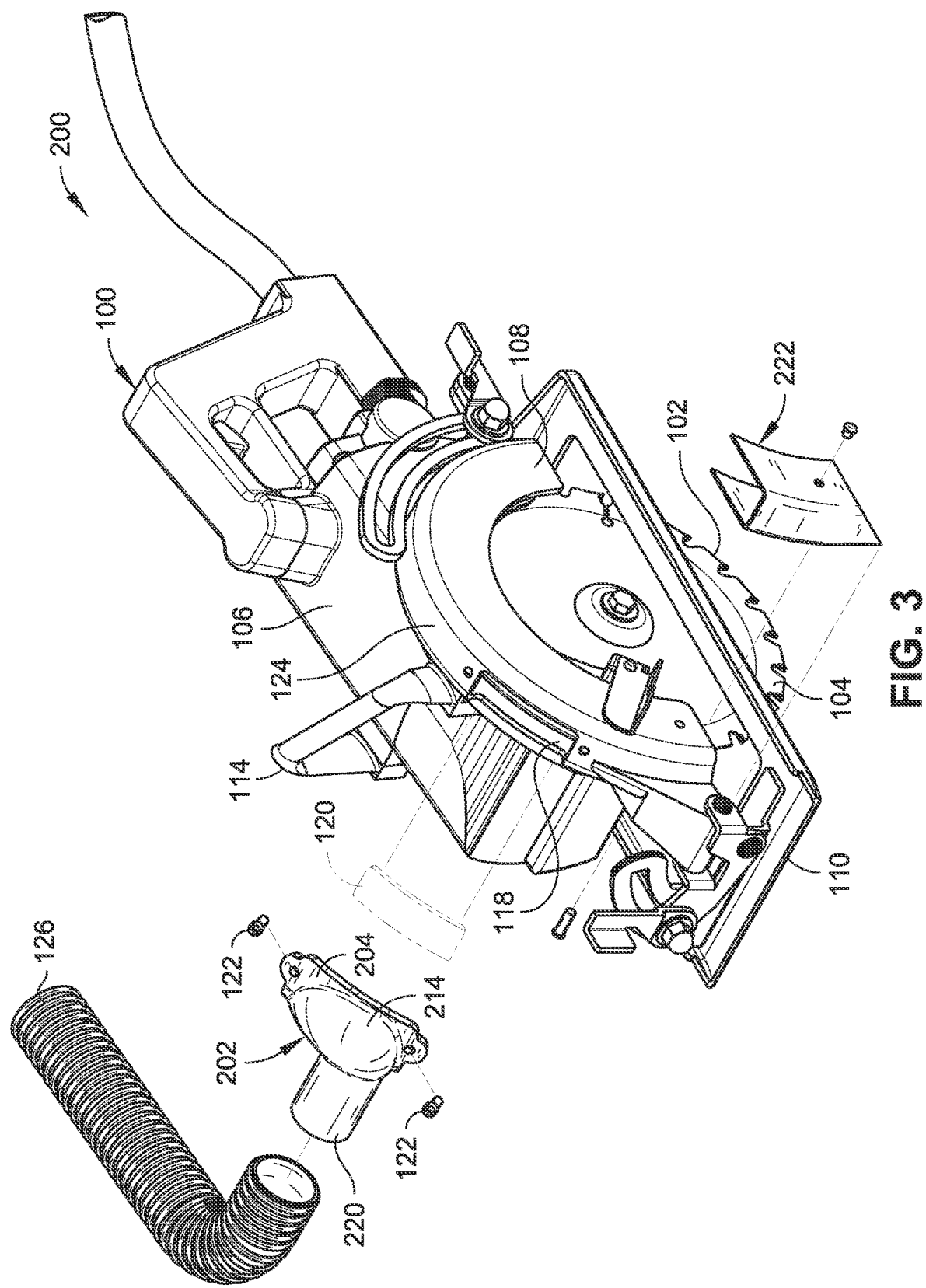
FIG. 3 is an exploded isometric view of the dust collection system illustrated in FIG. 1.
Figure 4:
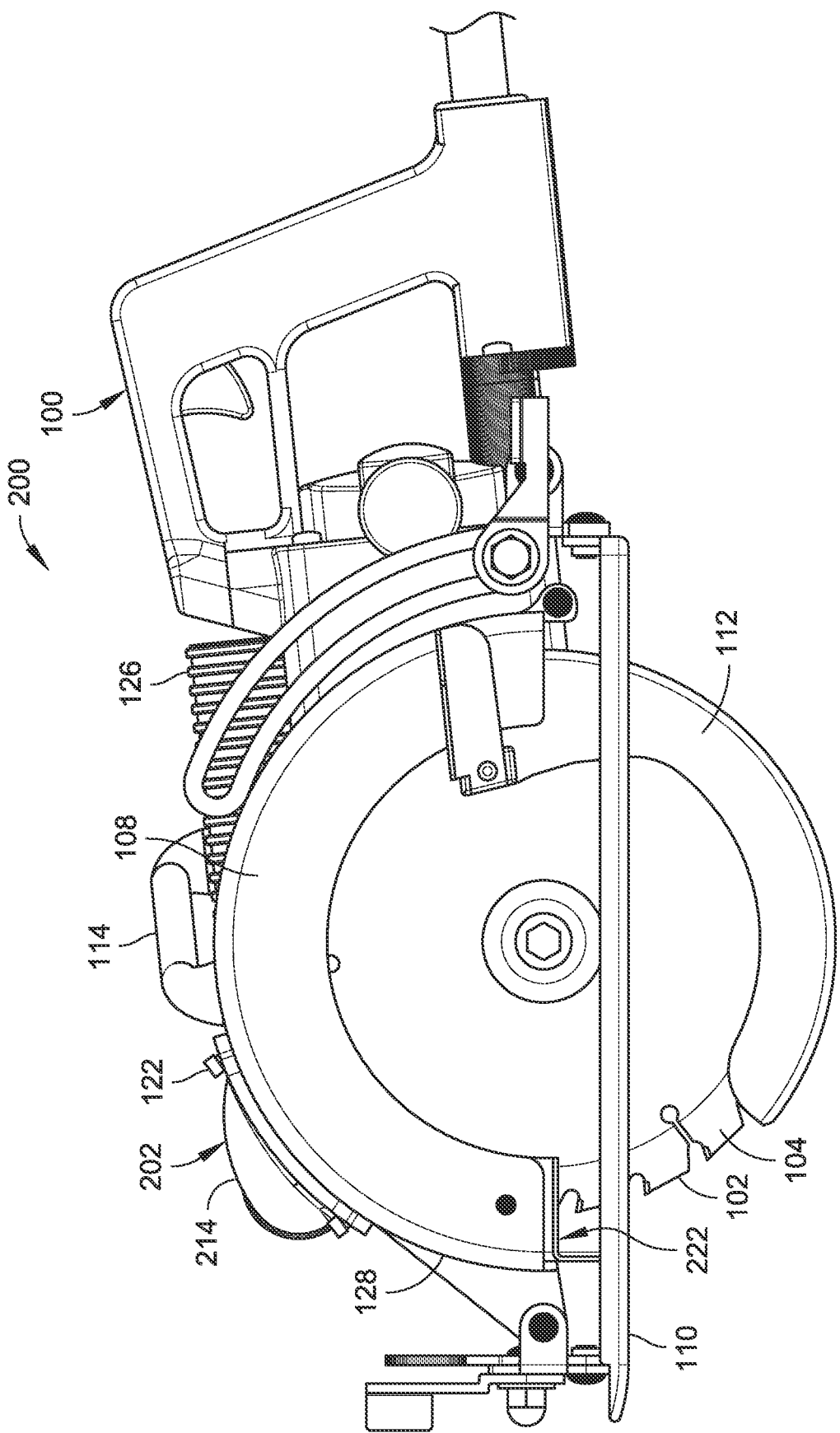
FIG. 4 is a side elevation view of the dust collection system illustrated in FIG. 1.
Figure 5:
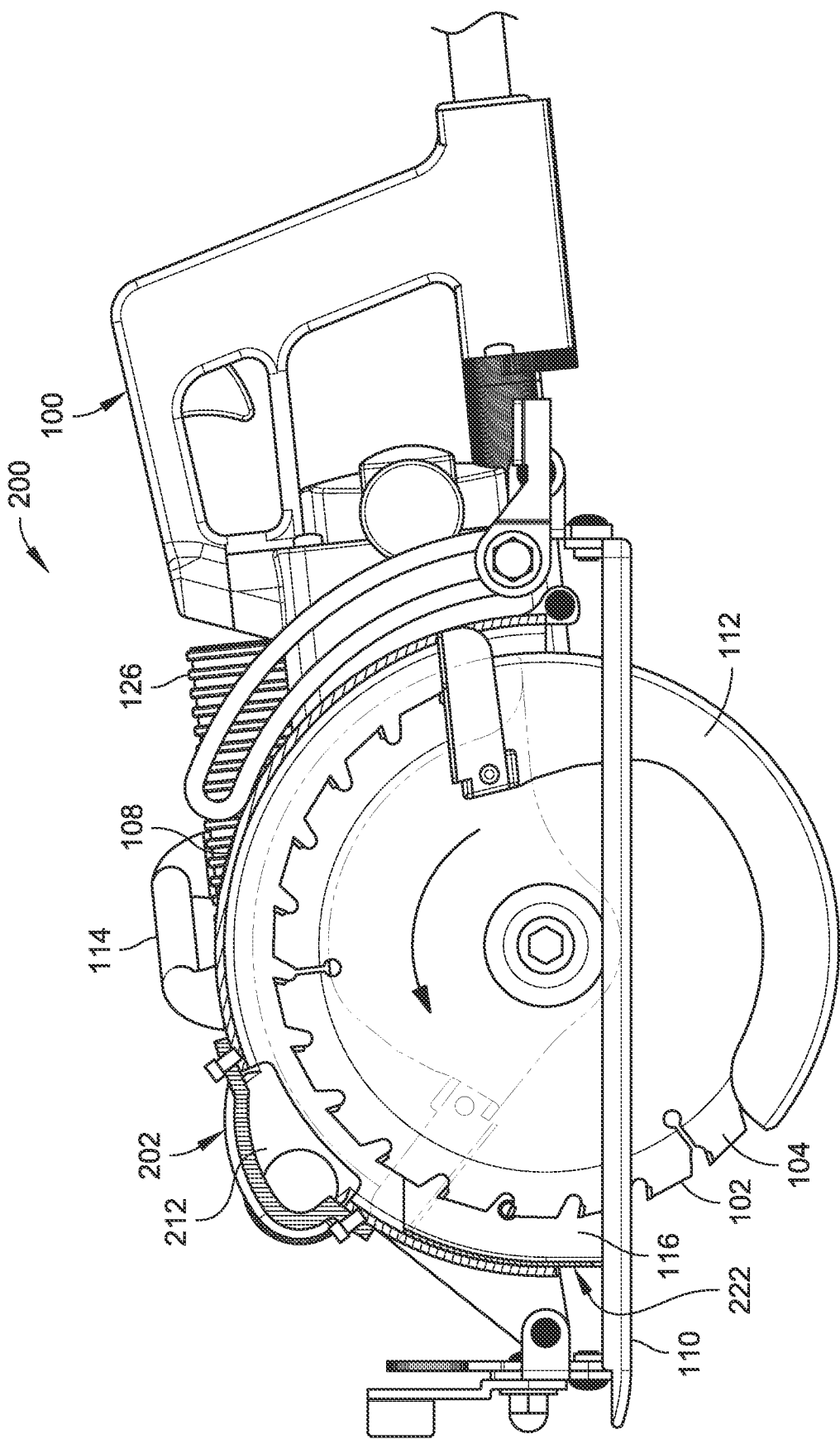
FIG. 5 is a partial cross-sectional side elevation view of the dust collection system illustrated in FIG. 1.
Figure 6:
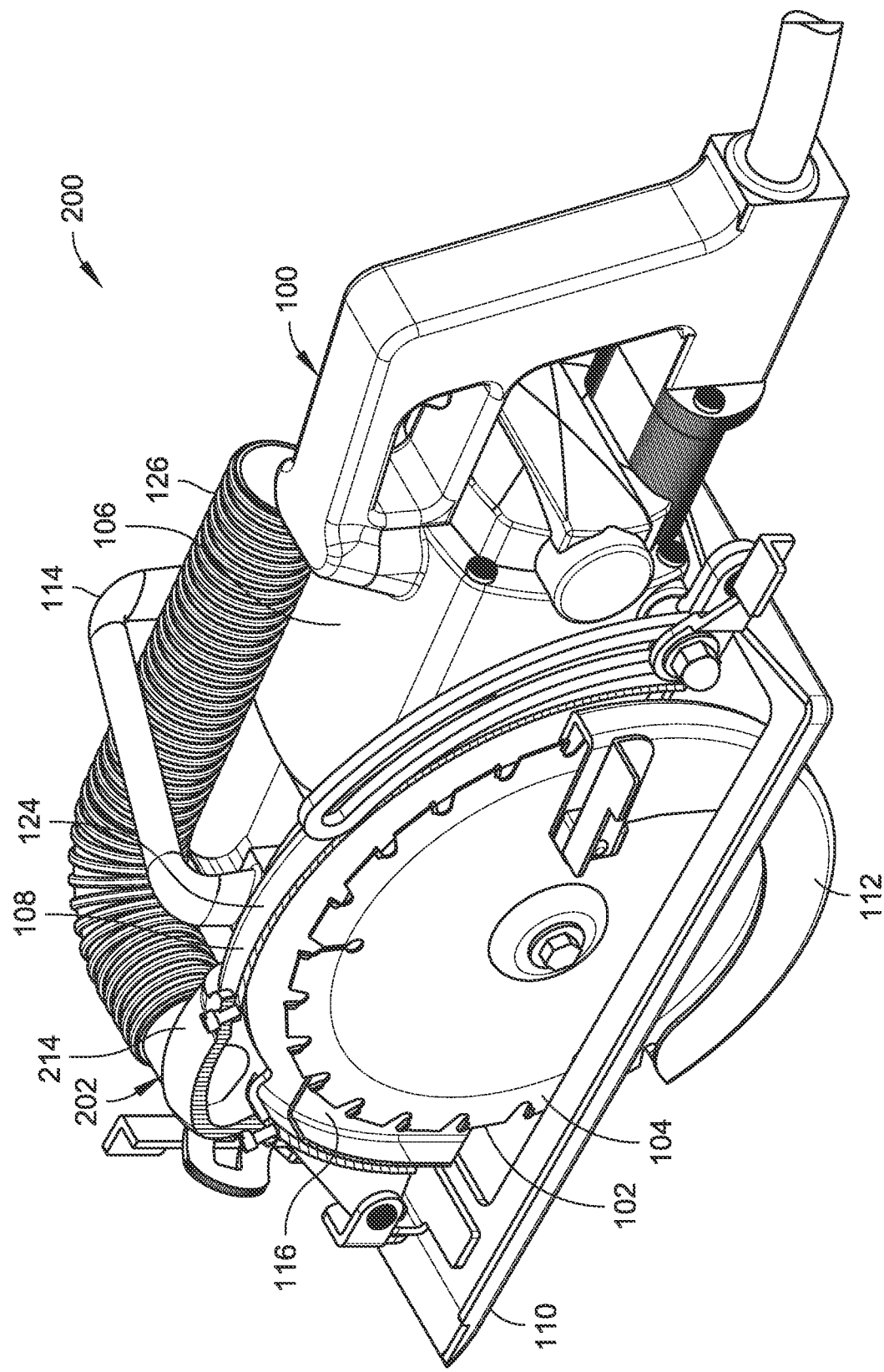
FIG. 6 is a partial cross-sectional isometric view of the dust collection system illustrated in FIG. 1.
Figure 7:
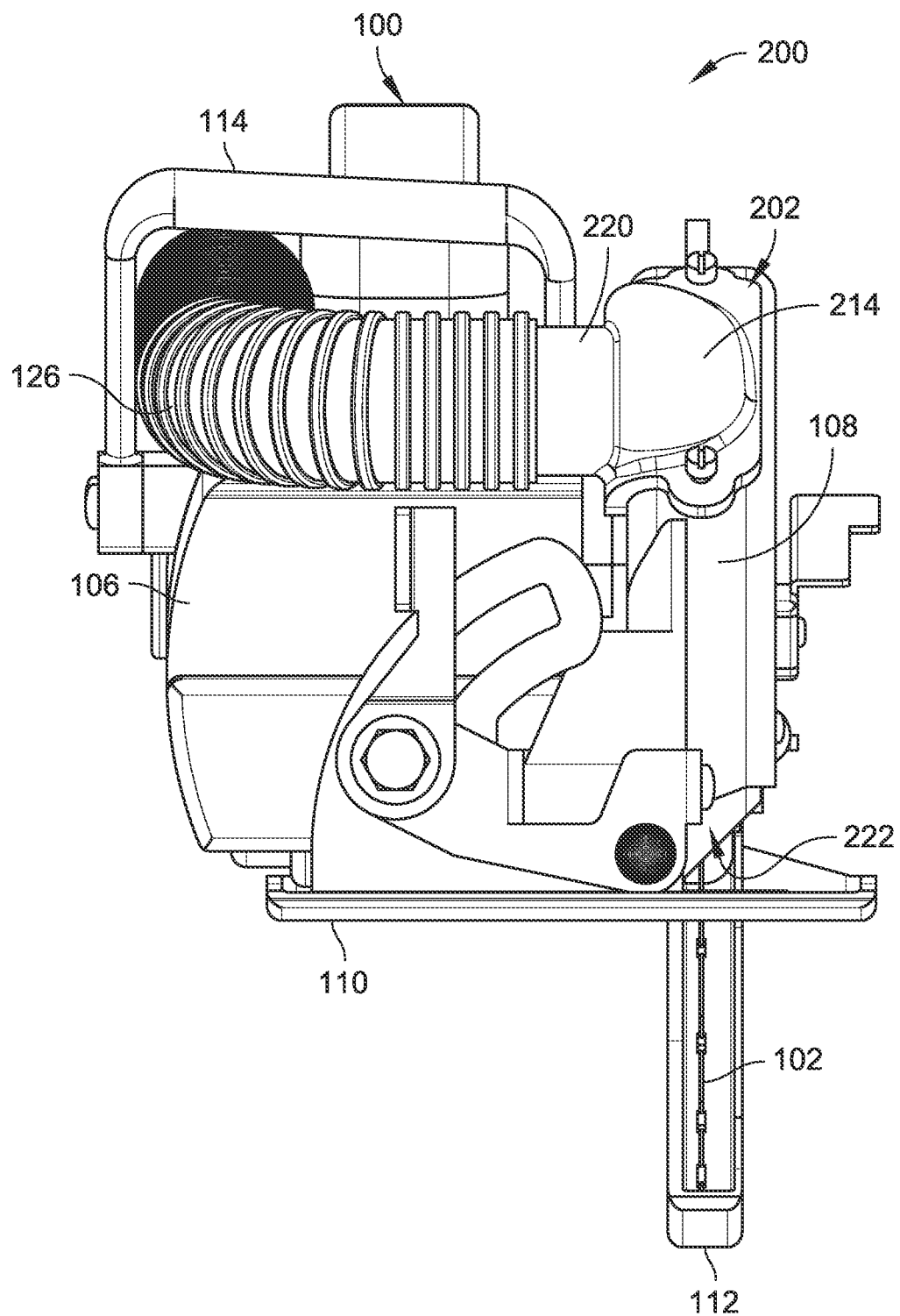
FIG. 7 is a front elevation view of the dust collection system illustrated in FIG. 1.
Figure 8:
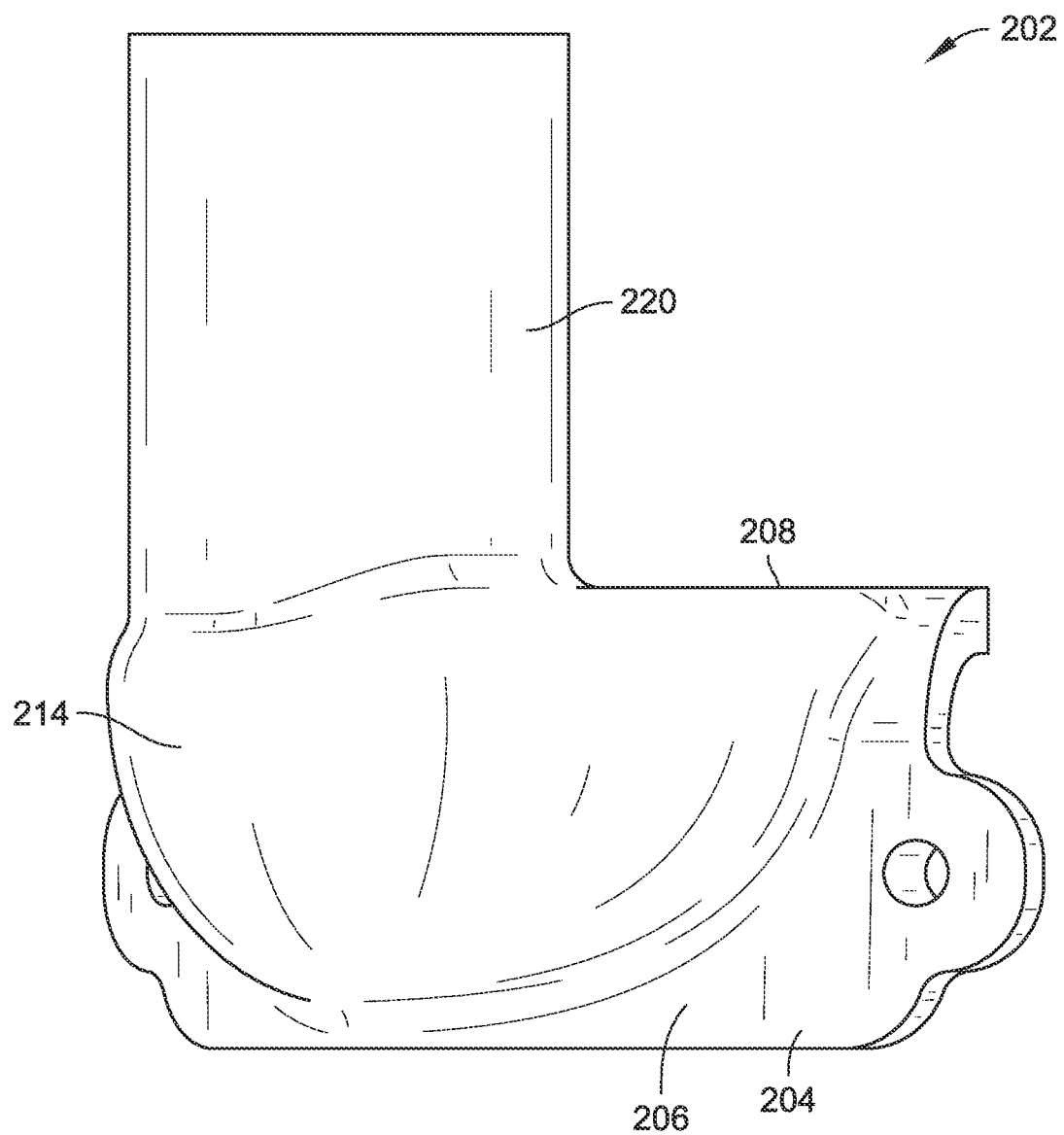
FIG. 8 is a top plan view illustrating an attachment for a dust collection system for a circular saw, such as the dust collection system illustrated in FIG. 1, in accordance with an example embodiment of the present disclosure.
Figure 9:
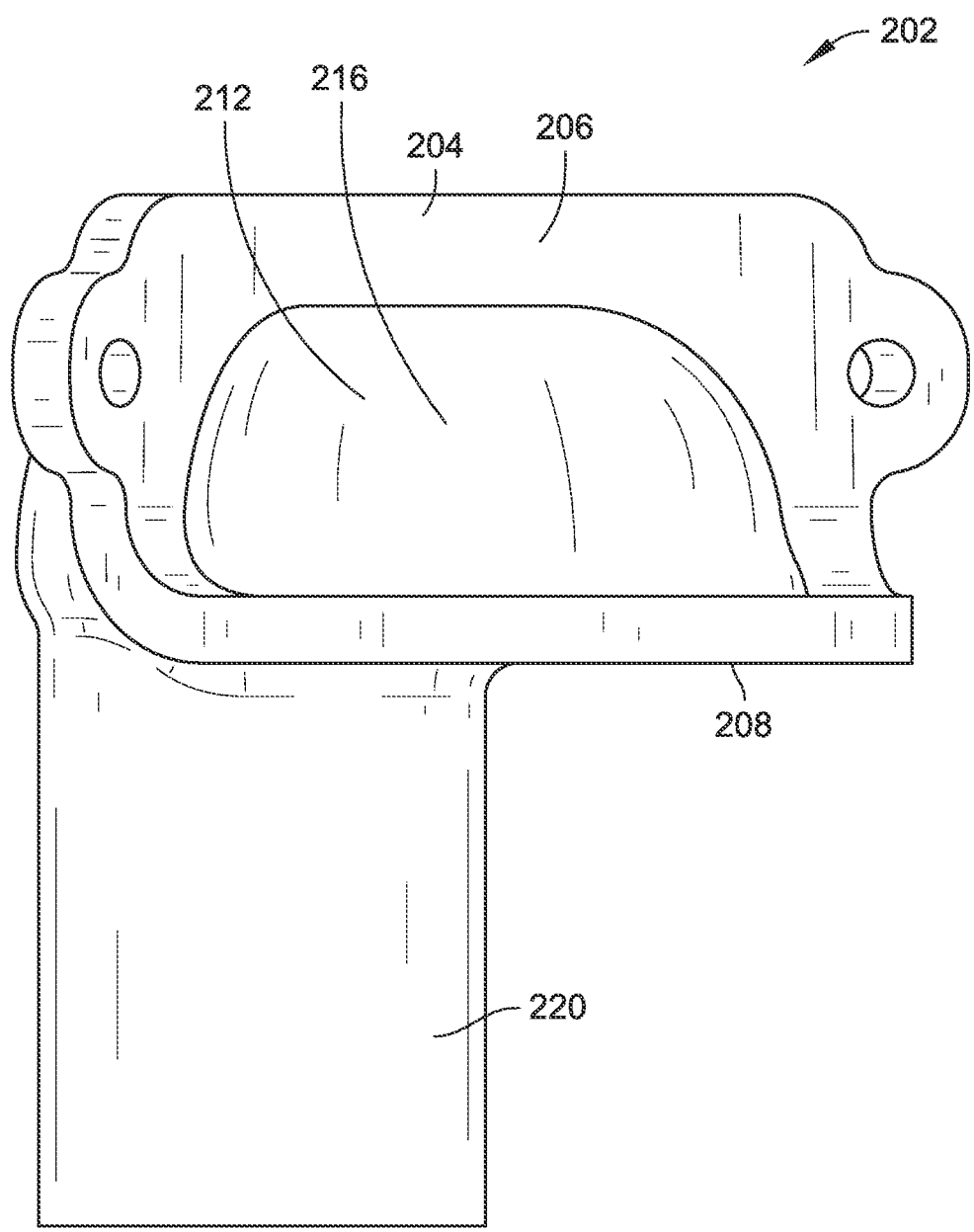
FIG. 9 is a bottom plan view of the attachment illustrated in FIG. 8.
Figure 10:
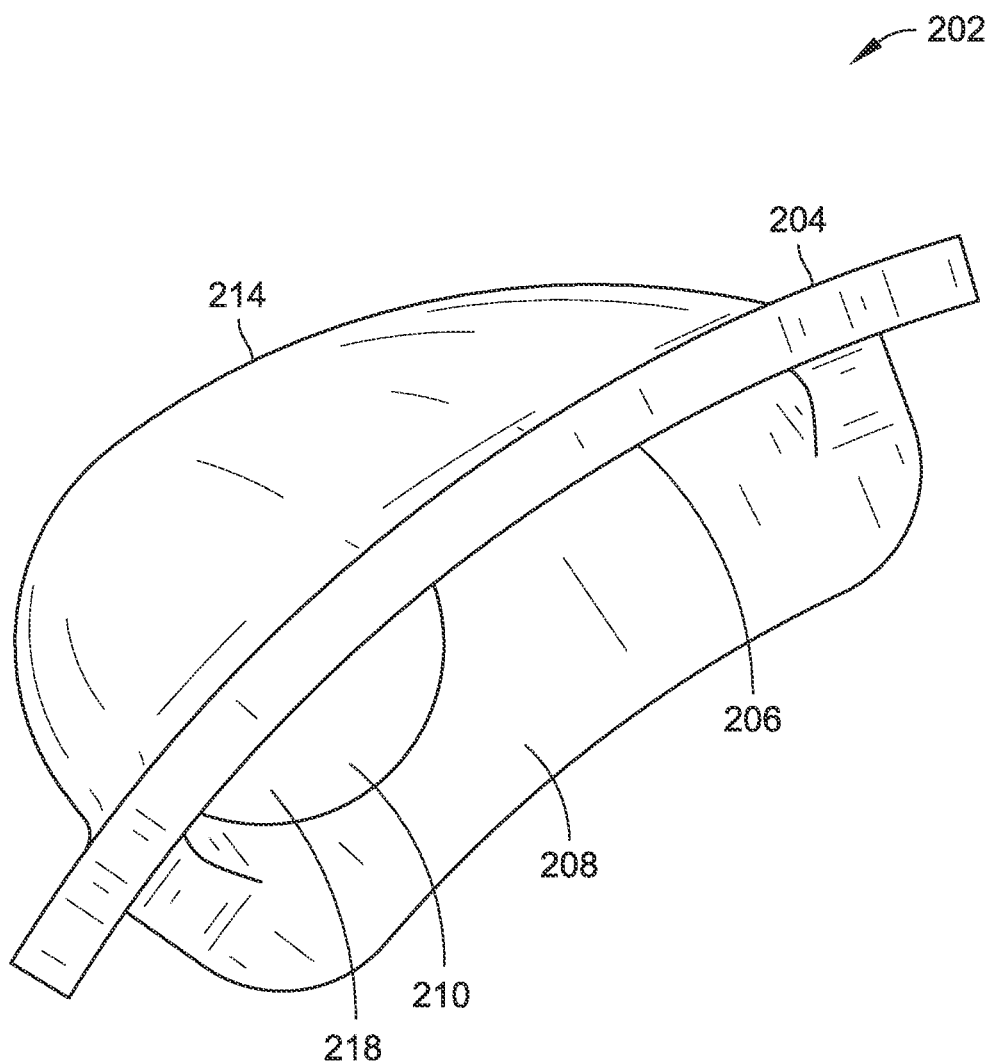
FIG. 10 is a side elevation view of the attachment illustrated in FIG. 8.
Figure 11:
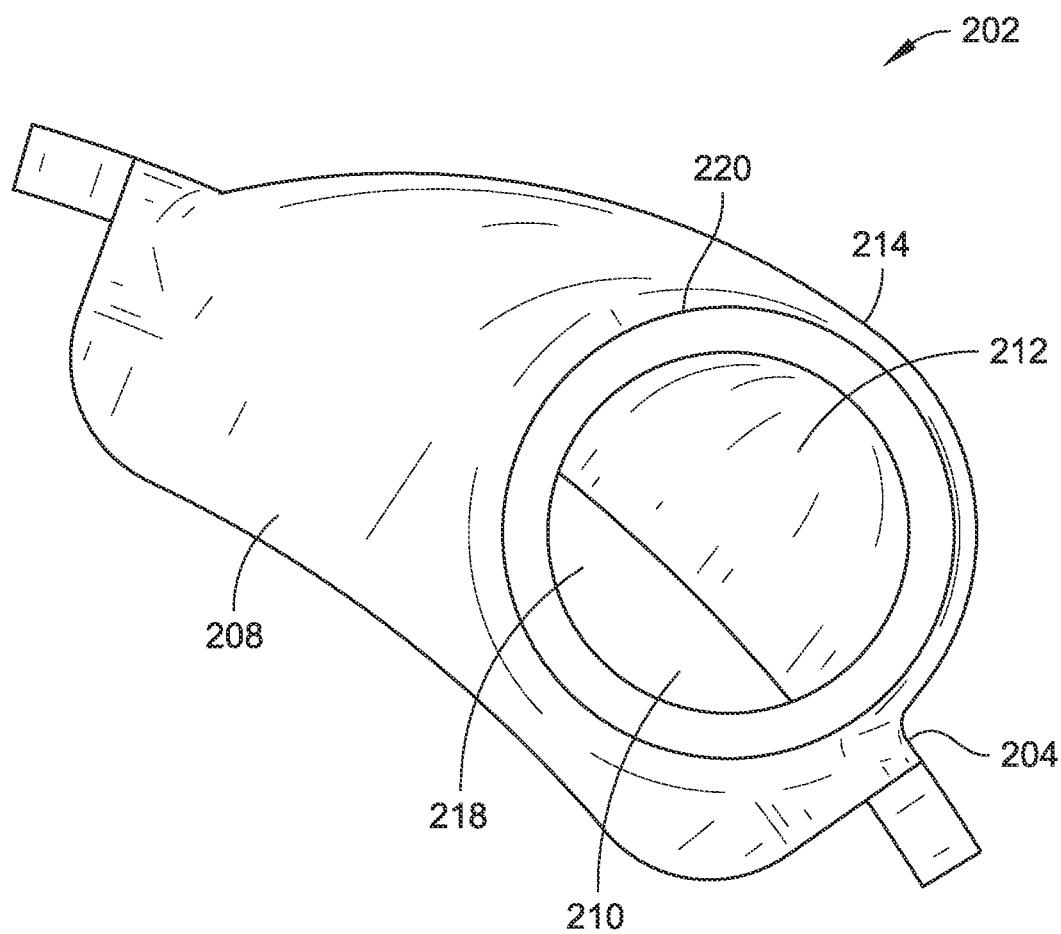
FIG. 11 is another side elevation view of the attachment illustrated in FIG. 8.
Figure 12:
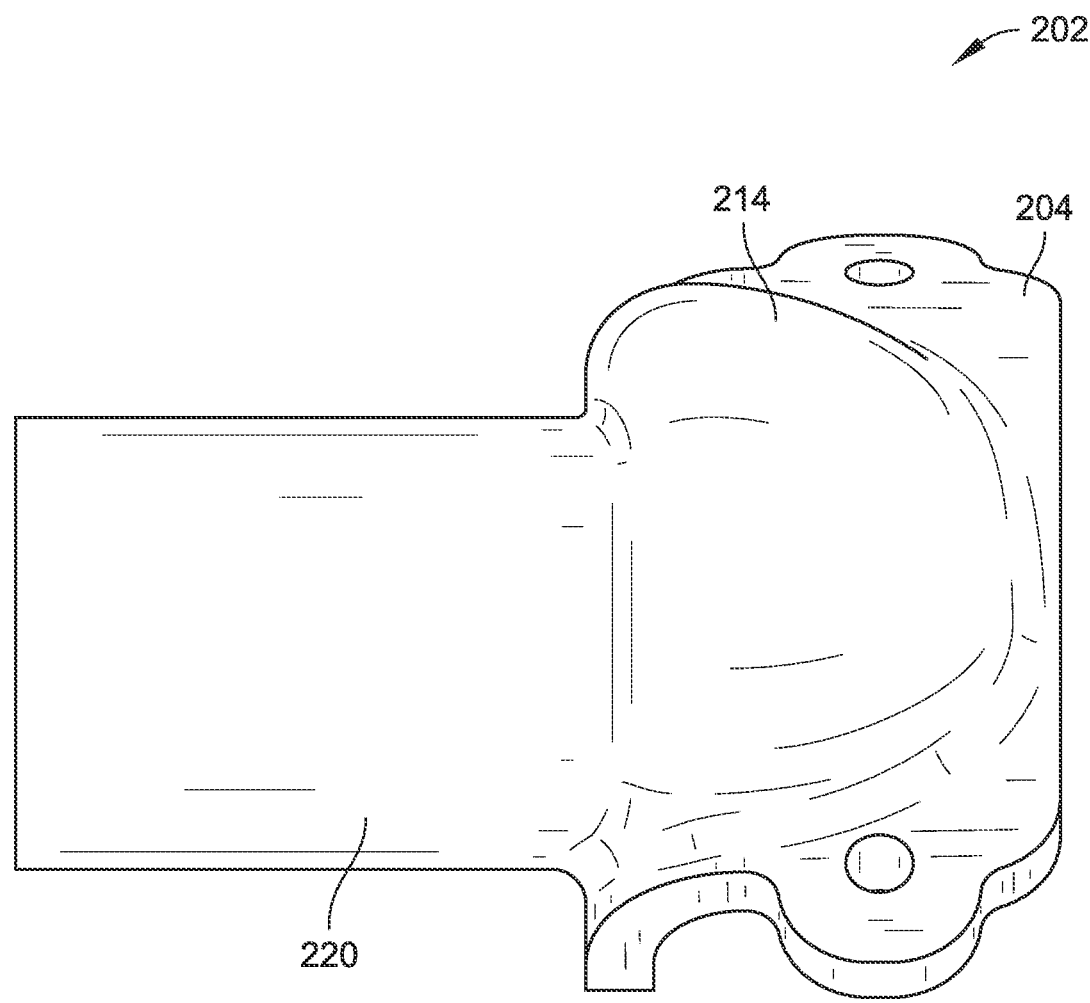
FIG. 12 is a front elevation view of the attachment illustrated in FIG. 8.
Figure 13:
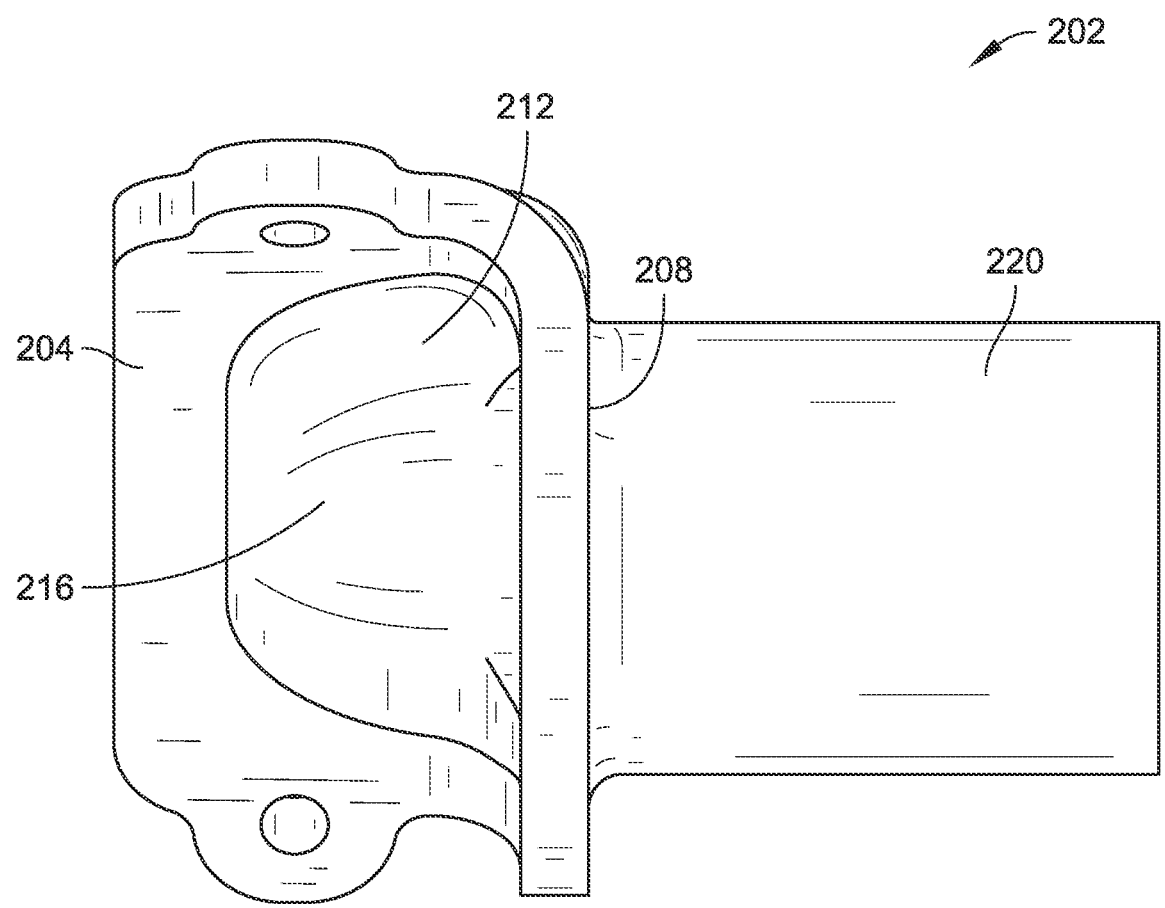
FIG. 13 is a rear elevation view of the attachment illustrated in FIG. 8.
Figure 14:
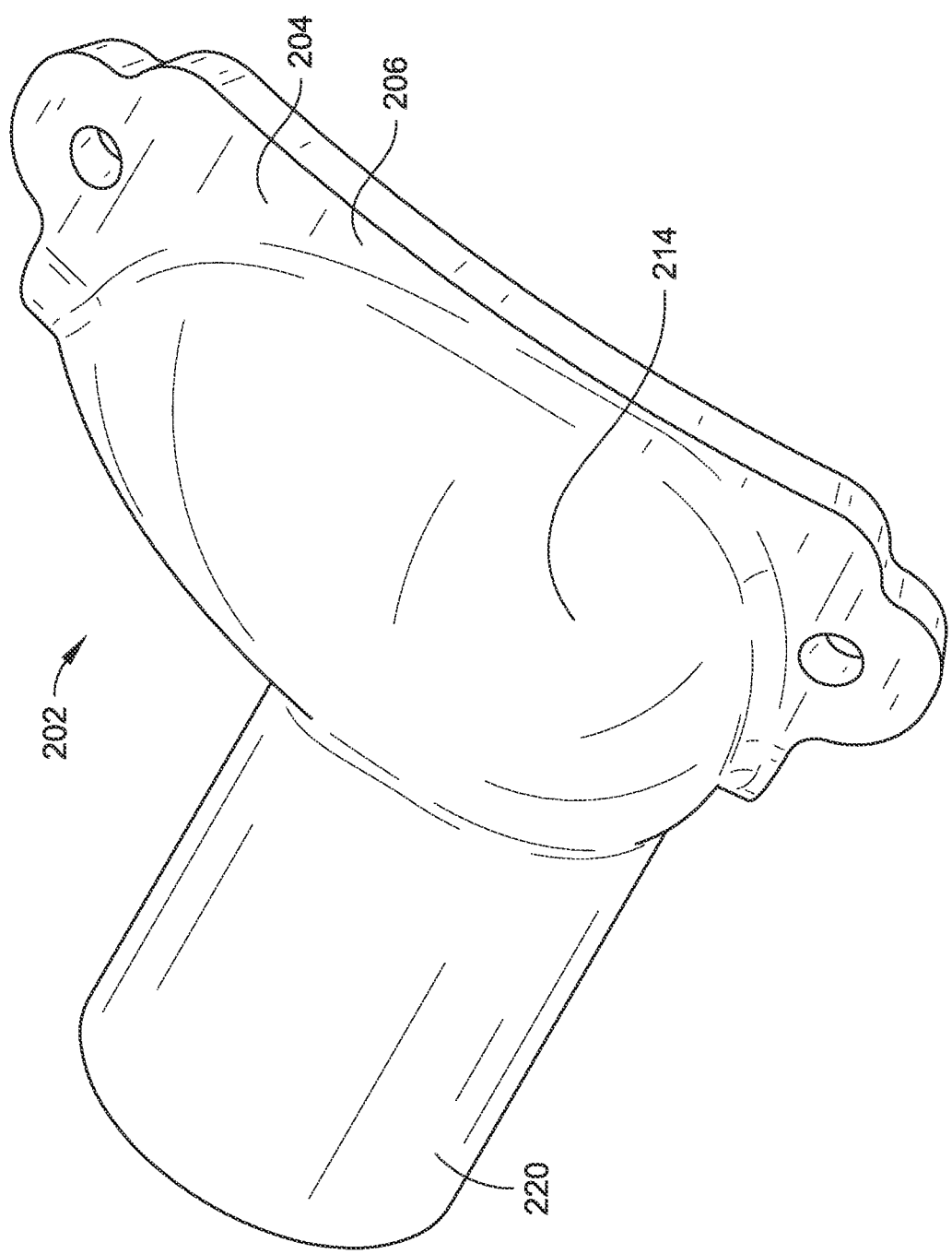
FIG. 14 is an isometric view of the attachment illustrated in FIG. 8.
Figure 15:
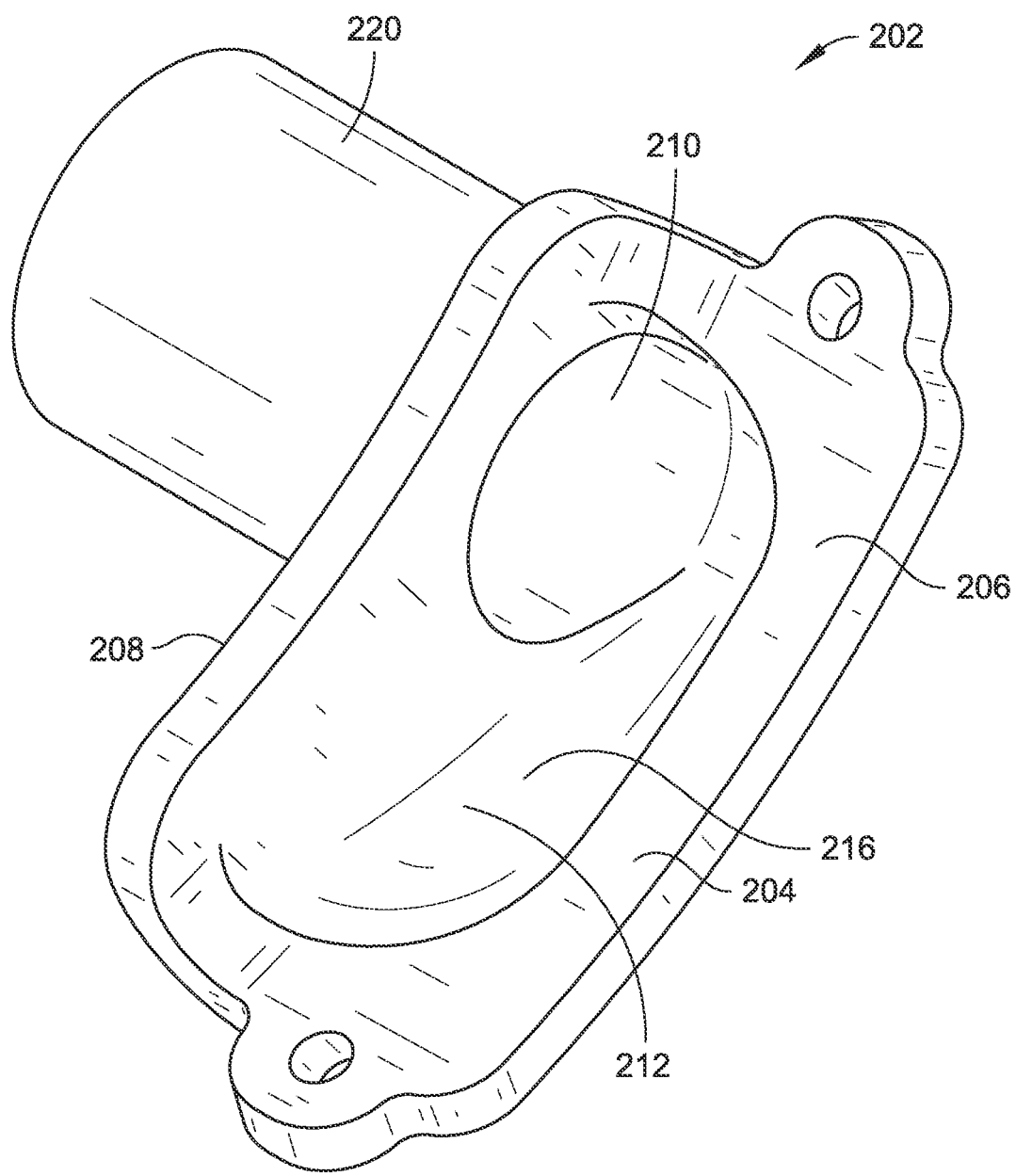
FIG. 15 is another isometric view of the attachment illustrated in FIG. 8.
Figure 16:
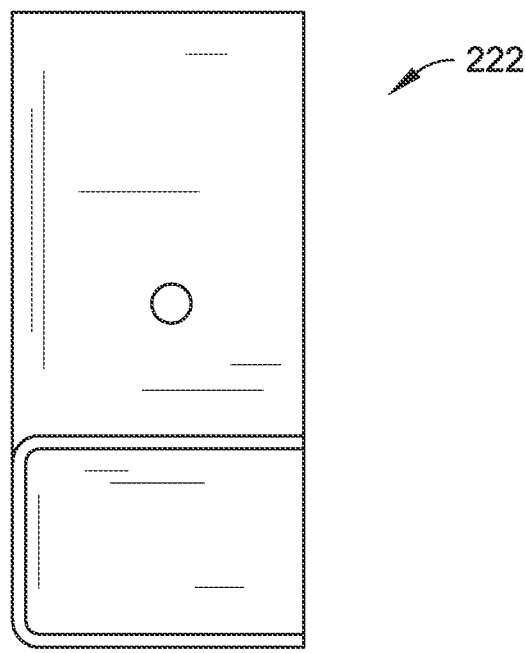
FIG. 16 is a side elevation view illustrating a blade guard extender for a dust collection system for a circular saw, such as the dust collection system illustrated in FIG. 1, in accordance with an example embodiment of the present disclosure.
Figure 17:
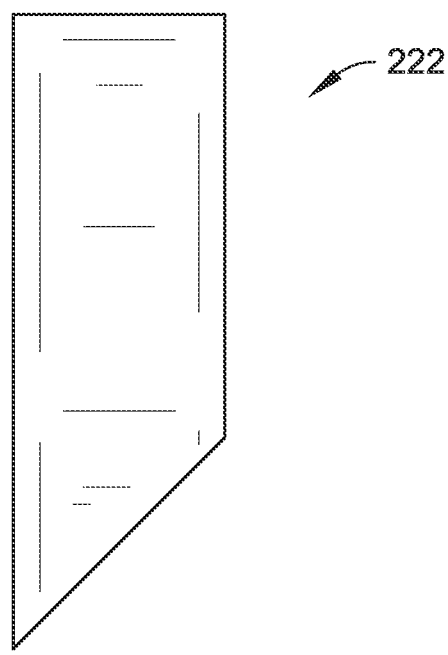
FIG. 17 is a front elevation view of the blade guard extender illustrated in FIG. 16.
Figure 18:
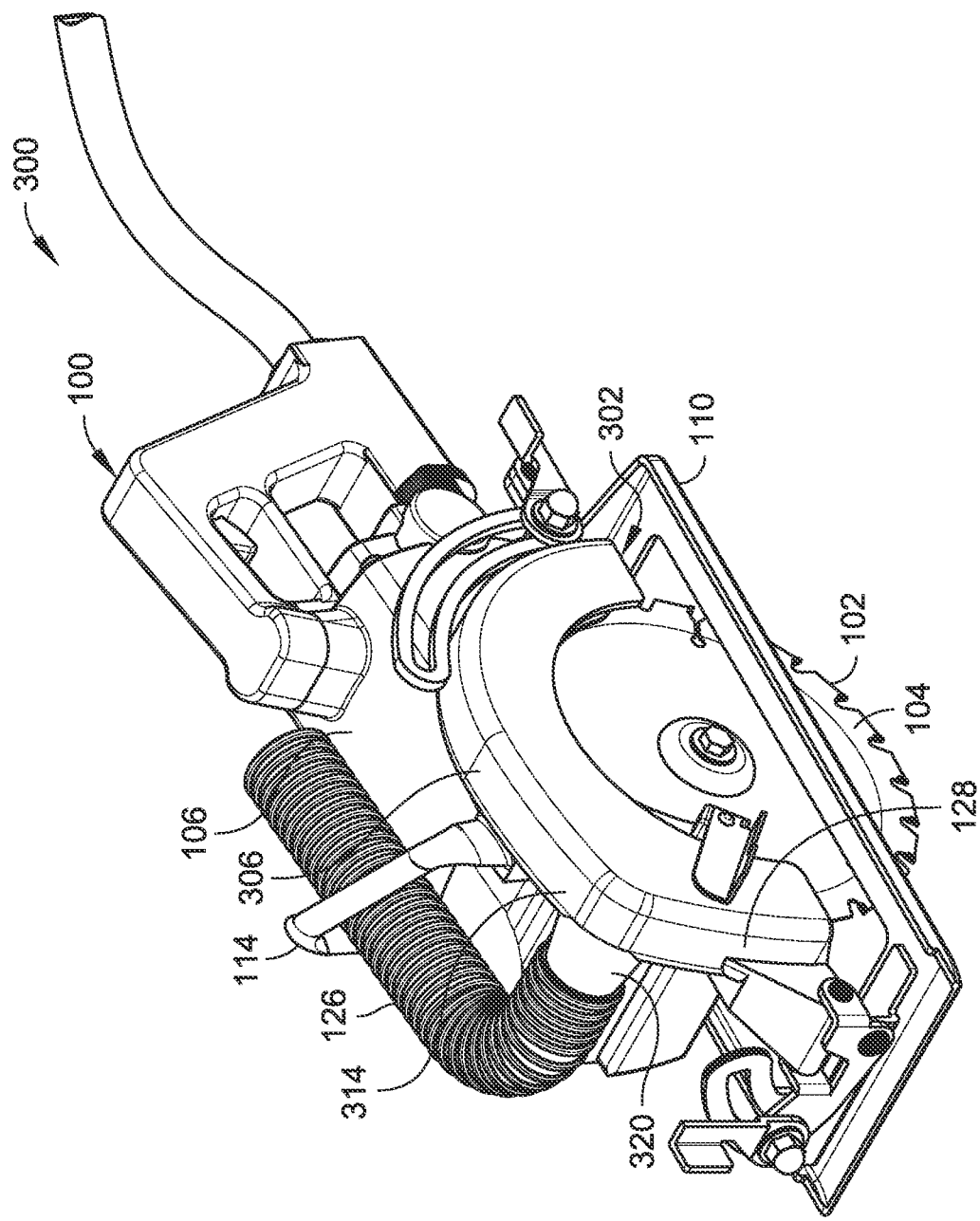
FIG. 18 is an isometric view illustrating a dust collection system including a fixed blade guard for a circular saw in accordance with an example embodiment of the present disclosure.
Figure 19:
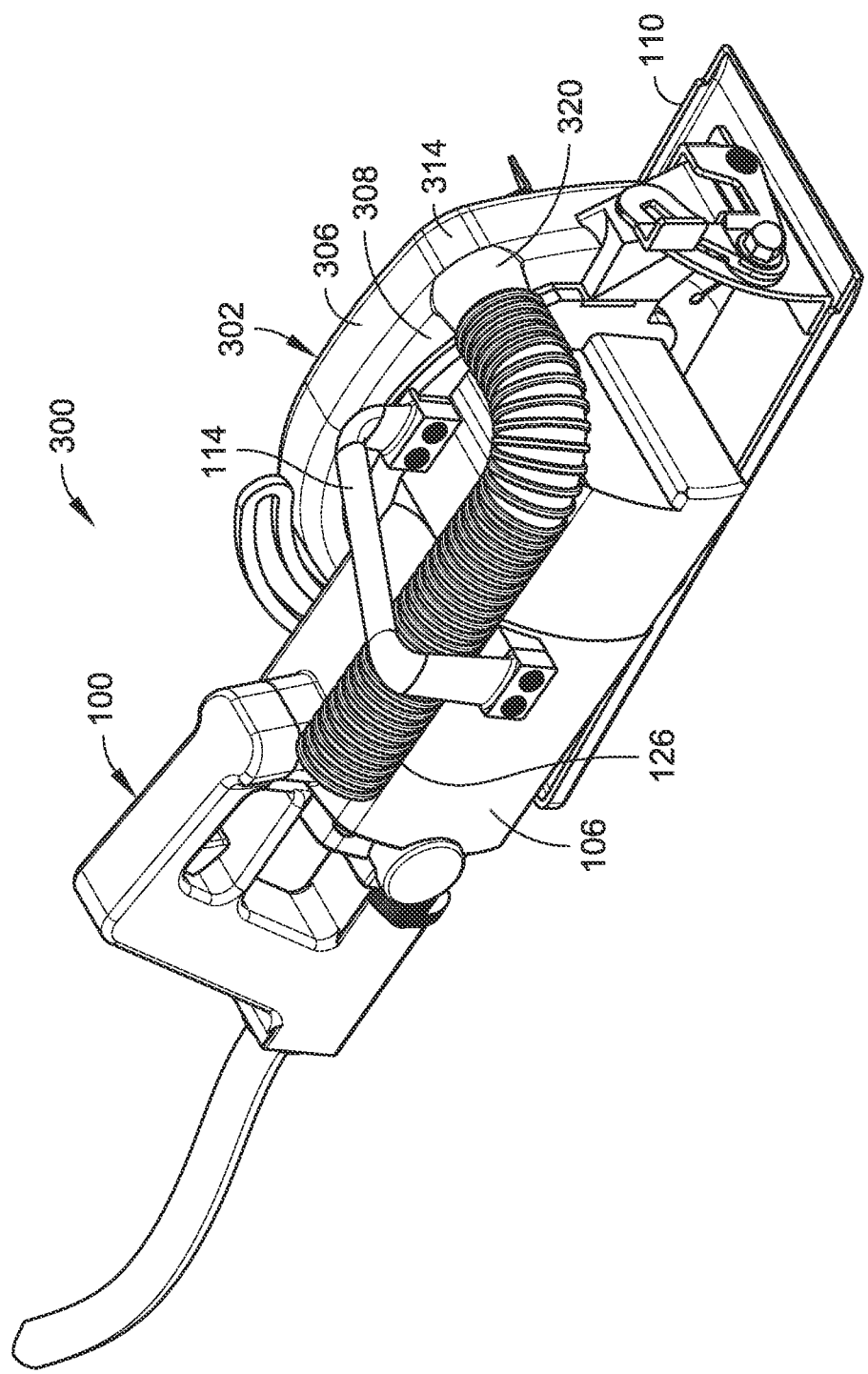
FIG. 19 is another isometric view of the dust collection system illustrated in FIG. 18.
Figure 20:
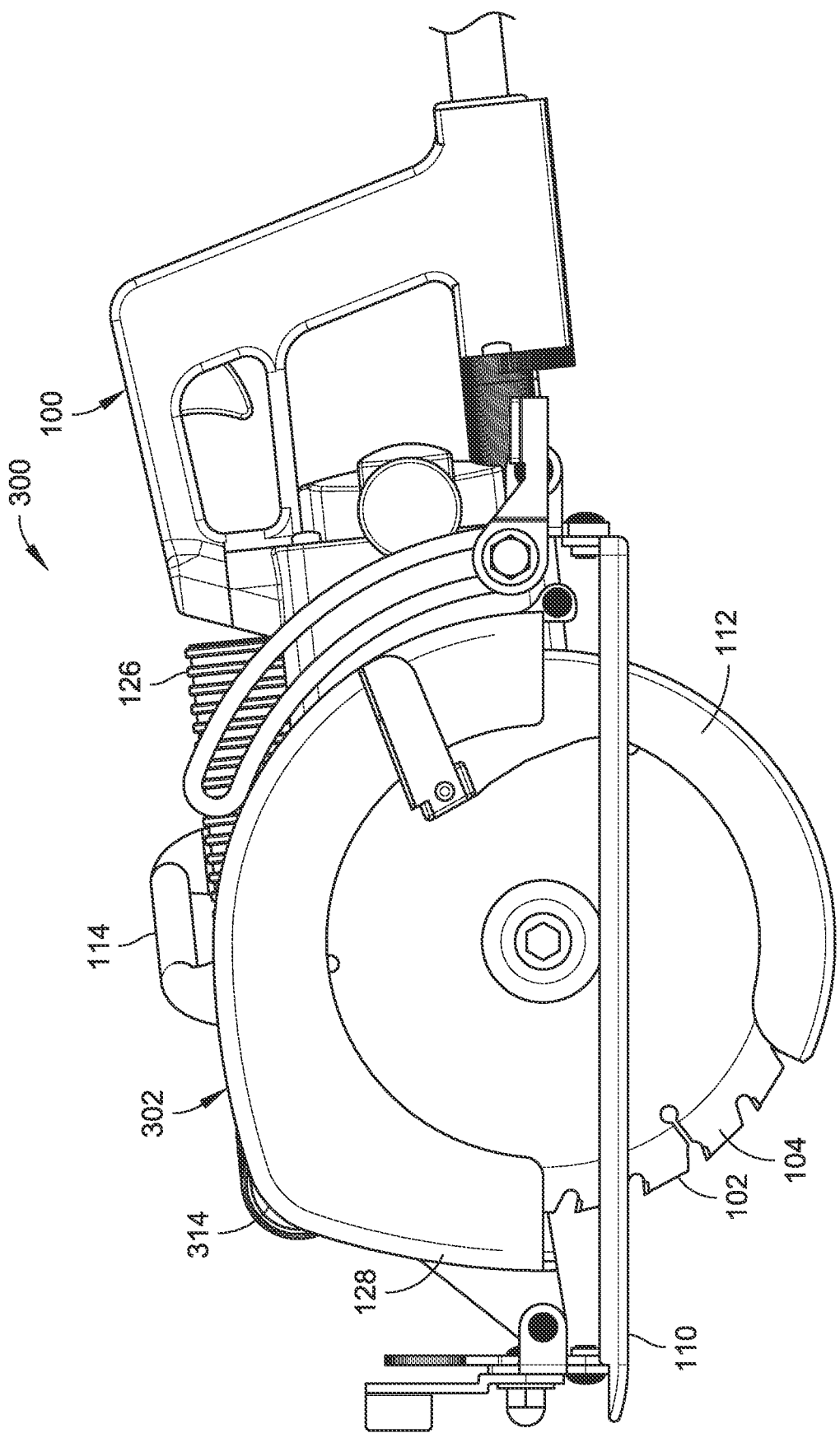
FIG. 20 is a side elevation view of the dust collection system illustrated in FIG. 18.

As described herein, systems and apparatus for extracting dust and debris can be used with various circular saws 100. With reference to FIGS. 1 through 17, a dust collection system 200 can include an attachment 202 for a fixed blade guard 108 of a worm-drive circular saw 100. The attachment 202 can be configured to be positioned (e.g., mounted) adjacent to the fixed blade guard 108 in fluid communication with an interior 116 (FIGS. 5 and 6) of the fixed blade guard 108 through an aperture 118 (FIG. 3) defined through the fixed blade guard 108. The aperture 118 may be formed by removing material 120 (FIG. 3) from the fixed blade guard 108 (e.g., by machining or cutting through the fixed blade guard 108). In embodiments of the disclosure, the attachment 202 can be fixedly connected to the fixed blade guard 108 using various mounting hardware (e.g., screws 122, bolts, rivets, etc.). For example, the attachment 202 may include tabs for receiving the screws 122.

The attachment 202 may include a mounting base 204 having an arcuate profile (e.g., an arcuate top profile 206) configured to be at least generally aligned with a top profile 124 of the fixed blade guard 108. The mounting base 204 includes a side 208 extending generally perpendicularly with respect to the arcuate top profile 206, and the mounting base 204 defines an exhaust port 210 for removing debris (e.g., dust, chips) drawn into the fixed blade guard 108. The mounting base 204 can be sized to completely cover the aperture 118 defined through the fixed blade guard 108 (e.g., the attachment 202 may be oversized with respect to the aperture 118).

A template (not shown) may be included with an attachment 202 to indicate how much of a fixed blade guard 108 is to be removed to form an aperture 118 sized and positioned appropriately for the attachment 202. The template may be shaped for one or more specific circular saw models to appropriately position the aperture 118. For example, the template can be designed to fill available space near a fixed blade guard 108, butting up to the edges of various obstructions near the fixed blade guard 108. The template may include one or more cutout shapes and/or holes as an indication of where and how much of the fixed blade guard 108 to remove.

In some embodiments, an attachment 202 can be used with an adapter (e.g., a gasket). For example, the attachment 202 can have a transitional profile between the arcuate top profile 206 and the side 208 of the mounting base 204 that is curved (e.g., for attachment to a circular saw 100 having a generally semi-circular cross-sectional top profile 124. However, another circular saw may have a more square-shaped cross-sectional top profile. In this instance, an adapter such as a gasket (e.g., a foam gasket) and/or another universal adapter may be used to secure the attachment 202 around the aperture 118 defined through the fixed blade guard 108 and prevent airflow through the seam between the attachment 202 and the fixed blade guard 108.

In some embodiments, an adapter specific to the shape of a differently-shaped cross-sectional profile may also be used to fill or reduce gaps between one (e.g., a rounded) cross-sectional profile of a mounting base 204 and another (e.g., a square) cross-sectional profile of a fixed blade guard 108. Further, it should be noted that a sealant (e.g., caulk or another sealant) may be used to fill or seal gaps between adjacent components, including, but not necessarily limited to, gaps between the attachment 202 and the fixed blade guard 108, between the attachment 202 and an intermediate gasket, between an intermediate gasket and the fixed blade guard 108, and so forth.

In embodiments of the disclosure, the exhaust port 210 extends through the side 208 of the mounting base 204 and into fluid communication with a cavity 212 defined by the mounting base 204. The cavity 212 is formed by a protrusion 214 of the arcuate top profile 206, and the cavity 212 has an expanded interior volume 216 extending from and adjacent to the exhaust port 210. As described herein, the protrusion 214 of the arcuate top profile 206 can have a rounded profile configured to minimize obstruction of an operator's vision when using the circular saw 100.

In some embodiments, a dust collection system 200 may also include a channel 218 in fluid communication with the expanded interior volume 216 of the cavity 212 through the exhaust port 210, where the channel 218 is defined by a connection 220 configured for connecting to a vacuum source (not shown) for pulling debris from within the fixed blade guard 108 into the cavity 212 and through the exhaust port 210 and the channel 218 toward the vacuum source. The connection 220 can be configured (e.g., sized) for connecting to, for example, a one and one-quarter inch (1-¼") diameter tube of the vacuum source (e.g. a vacuum hose 126). However, other vacuum tube and/or hose diameters may also be used, including, but not necessarily limited to: three-quarters of an inch (¾") diameter hoses, one-inch (1") diameter hoses, and so forth. A vacuum hose 126 may be rigid and/or flexible.

A cap (not shown) may be placed on the connection 220 to block the flow of dust and debris from the exhaust port 210, e.g., when the connection 220 is not connected to a tube or hose. In some embodiments, the vacuum hose 126 can be sized to extend through the handle 114 and be positioned to one side of the handle 114 to minimized obstruction of an operator's grip on the handle 114. However, in other embodiments, one or more hooks and/or clips on a side of the circular saw 100 can be used to hold the vacuum hose 126 in place. Further, a coupling, such as a plastic ring or a looped metal strip attached to a side of the circular saw 100 may be used to hold the vacuum hose 126 in place. In some embodiments, the circular saw 100 may also include a hook, loop, clip, or another holder integrally formed as part of and/or connected to a handle 114 (e.g., to one side of the handle 114).

Without wishing to be bound by any particular theory or principle of operations, it is believed that the expansion of the expanded interior volume 216 adjacent to the exhaust port 210 creates additional volume where dust and debris may collect prior to being drawn into the channel 218 and the vacuum hose 126 through the exhaust port 210. This arrangement may thus reduce or minimize the flow of the dust and debris from out of the fixed blade guard 108 and into the surrounding environment, as more dust and debris is pulled into the vacuum hose 126. It is also believed that the speed at which an abrasive disc or blade 102 is driven (e.g., by the motor 106) affects the ability of a circular saw 100 to effectively collect dust and debris. For example, in some embodiments the rotational speed of a disc or blade 102 is between about three thousand five hundred (3,500)

revolutions per minute (RPM) and about four thousand five hundred (4,500) RPM. However, this range is provided by way of example and is not meant to limit the present disclosure. In other embodiments, the rotational speed at which a disc or blade 102 is driven may be less than about three thousand five hundred (3,500) RPM and/or greater than about four thousand five hundred (4,500) RPM. For instance, the rotational speed at which a disc or blade 102 is driven may be as much as about five thousand three hundred (5,300) RPM.

It should be noted that positioning the exhaust port 210 closer to the front of the circular saw 100 and positioning the expansion portion of the expanded interior volume 216 extending in a direction away from the front of the circular saw 100 may further enhance the drawing of dust and debris into the channel 218 and the vacuum hose 126 through the exhaust port 210 (e.g., by shortening the distance between the front of the circular saw 100 where the blade 102 impacts material to be cut and the exhaust port 210). However, it should be noted that in other embodiments, the expanded interior volume 216 may also extend in a direction toward the front of the circular saw 100 instead of, or in addition to, extending away from the front of the circular saw 100 (e.g., as described with reference to FIGS. 18 through 31).

The dust collection system 200 may also include a blade guard extender 222 or another tunnel extender disposed at an end 128 of the fixed blade guard 108 and configured to extend the interior 116 of the fixed blade guard 108 in a direction away from the attachment 202 to enhance the pulling of the debris from within the fixed blade guard 108 into the cavity 212 of the attachment 202. In embodiments of the disclosure, the blade guard extender 222 may be formed from a flexible or viscoelastic material, such as rubber or a rubber-like solid (e.g., an elastic polymer, elastomer). In this manner, the blade guard extender 222 may be used with a circular saw 100 that allows the angle of the blade 102 to be changed with respect to the base plate 110, such as a forty-five-degree (45°) bevel table. Further, when viewed from the end 128 of the circular saw 100, the blade guard extender 222 may itself be angled at about forty-five degrees (45°) or another angle with respect to the horizontal. In embodiments of the disclosure, the blade guard extender 222 can be fixedly connected to the fixed blade guard 108 using various mounting hardware (e.g., screws, bolts, rivets, etc.).

Figure 21:
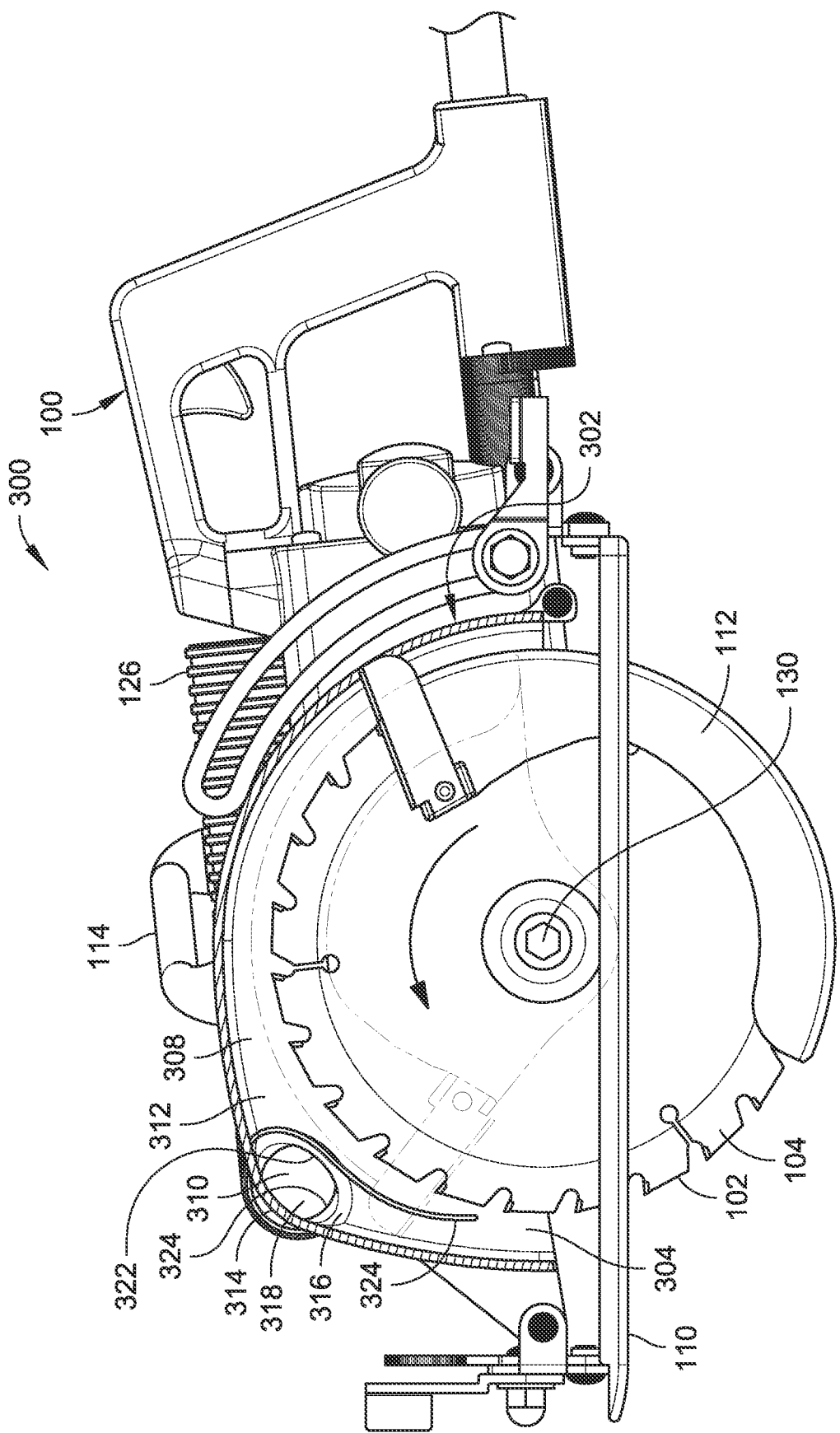
FIG. 21 is a partial cross-sectional side elevation view of the dust collection system illustrated in FIG. 18.
Figure 22:
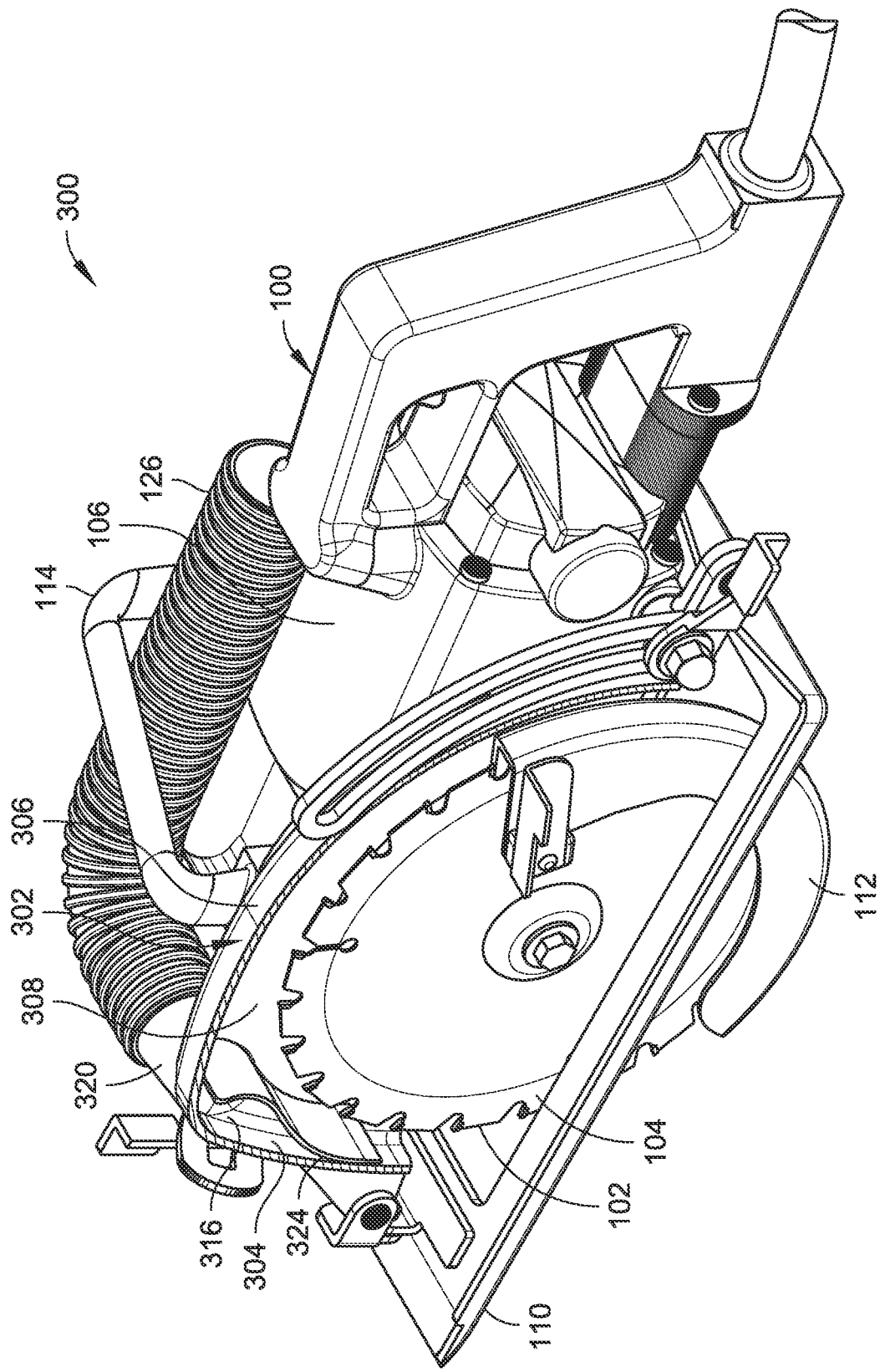
FIG. 22 is a partial cross-sectional isometric view of the dust collection system illustrated in FIG. 18.
Figure 23:
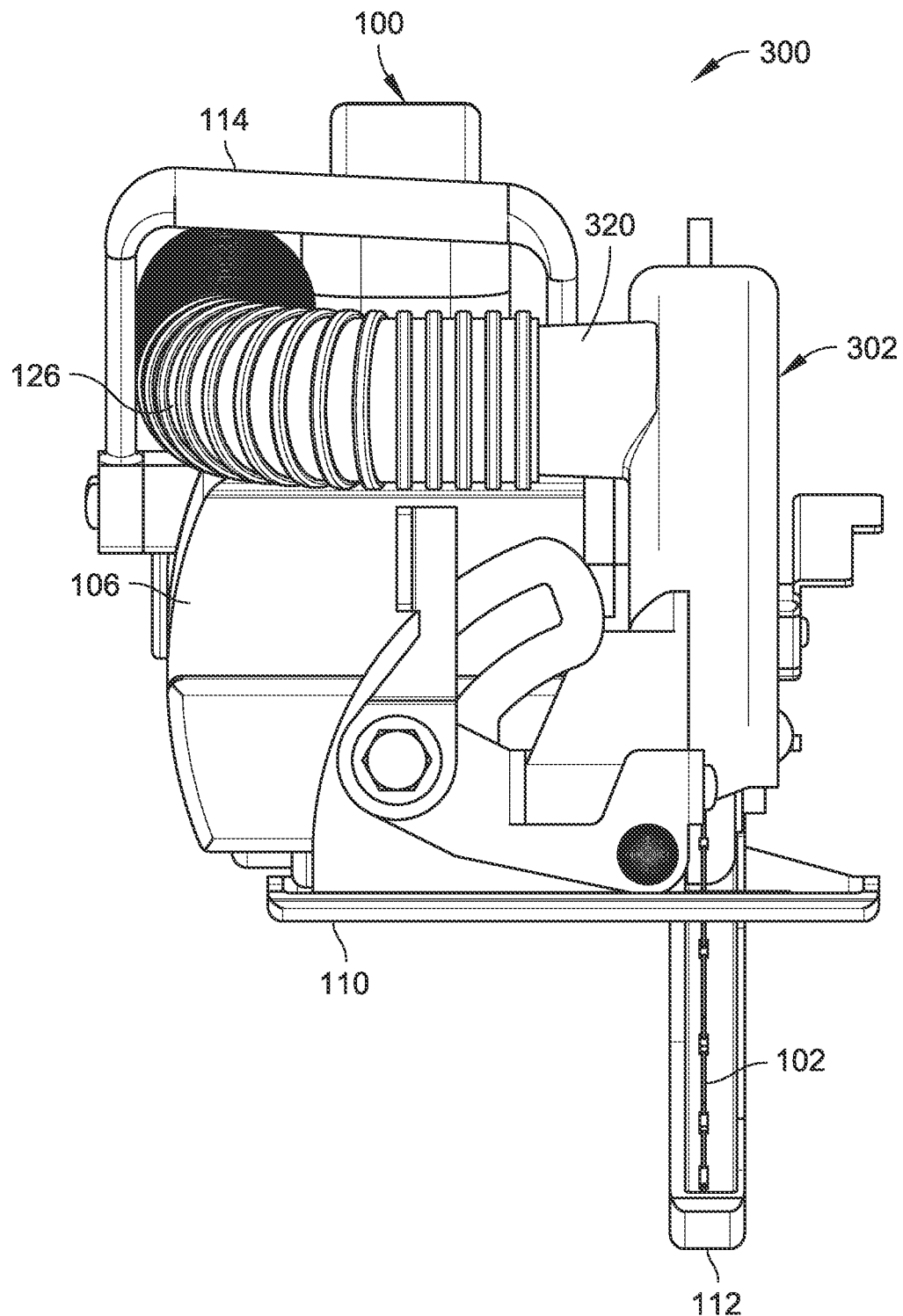
FIG. 23 is a front elevation view of the dust collection system illustrated in FIG. 18.
Figure 24:
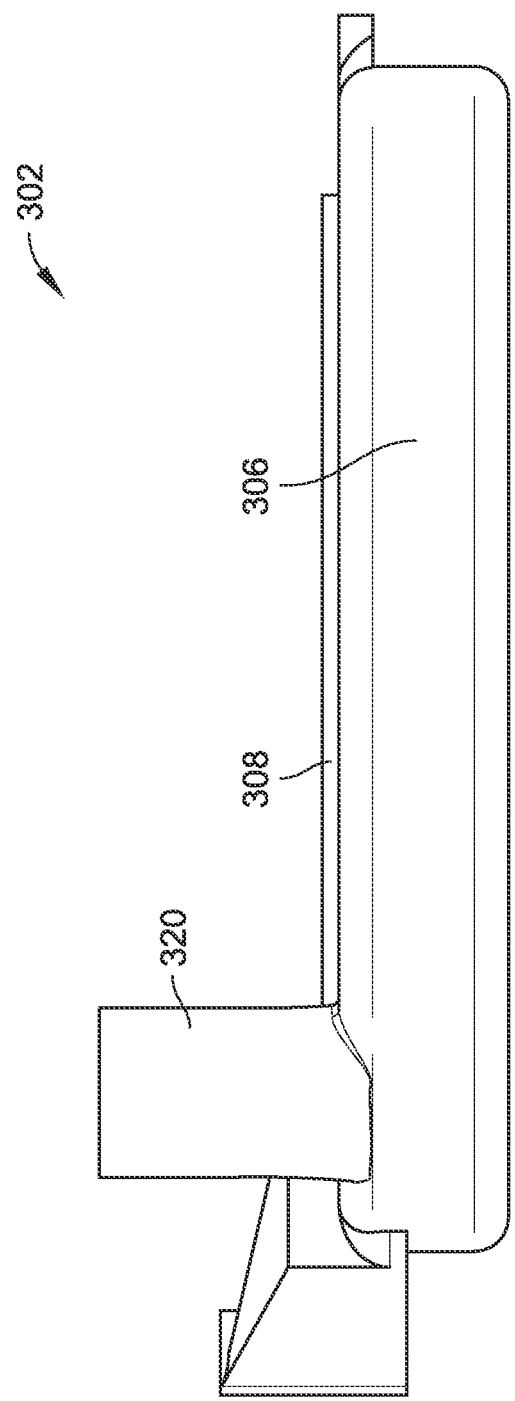
FIG. 24 is a top plan view illustrating a fixed blade guard for a dust collection system for a circular saw, such as the dust collection system illustrated in FIG. 18, in accordance with an example embodiment of the present disclosure.
Figure 25:
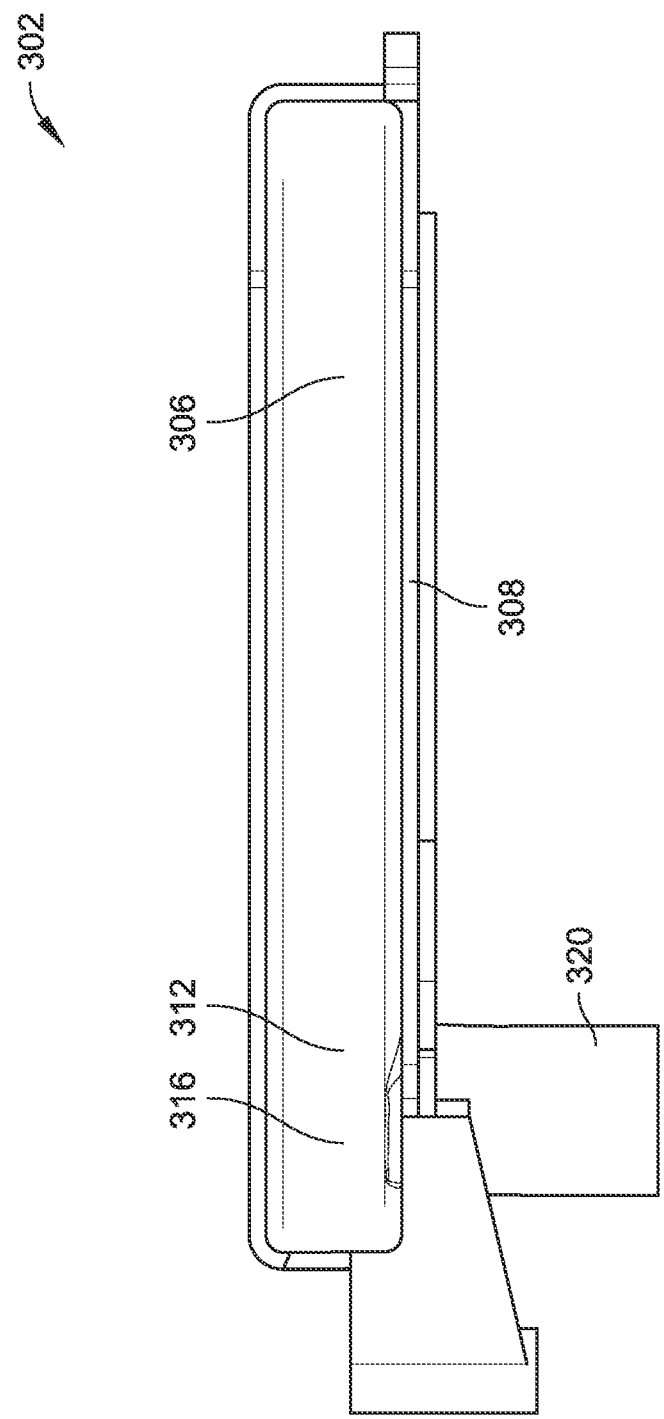
FIG. 25 is a bottom plan view of the fixed blade guard illustrated in FIG. 24.
Figure 26:
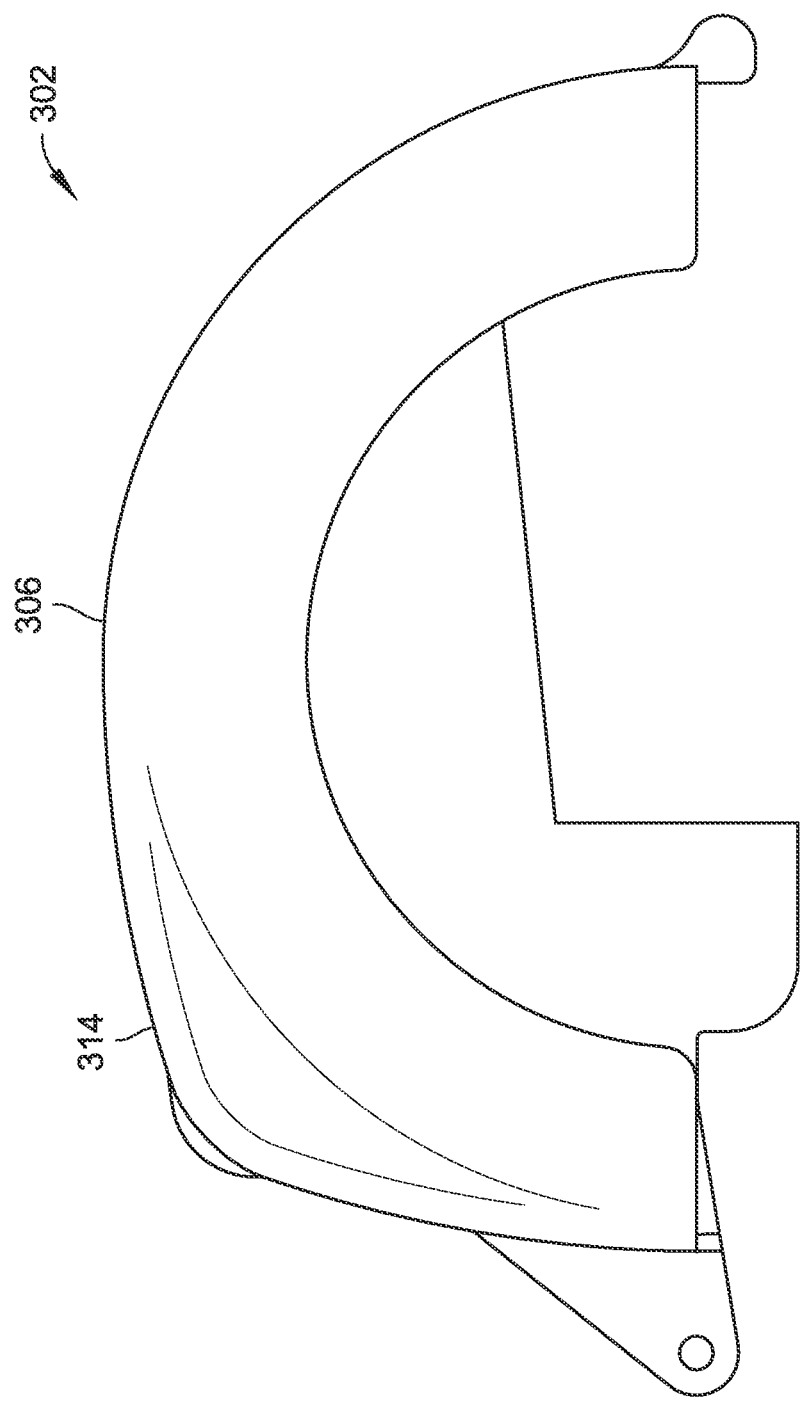
FIG. 26 is a side elevation view of the fixed blade guard illustrated in FIG. 24.
Figure 27:
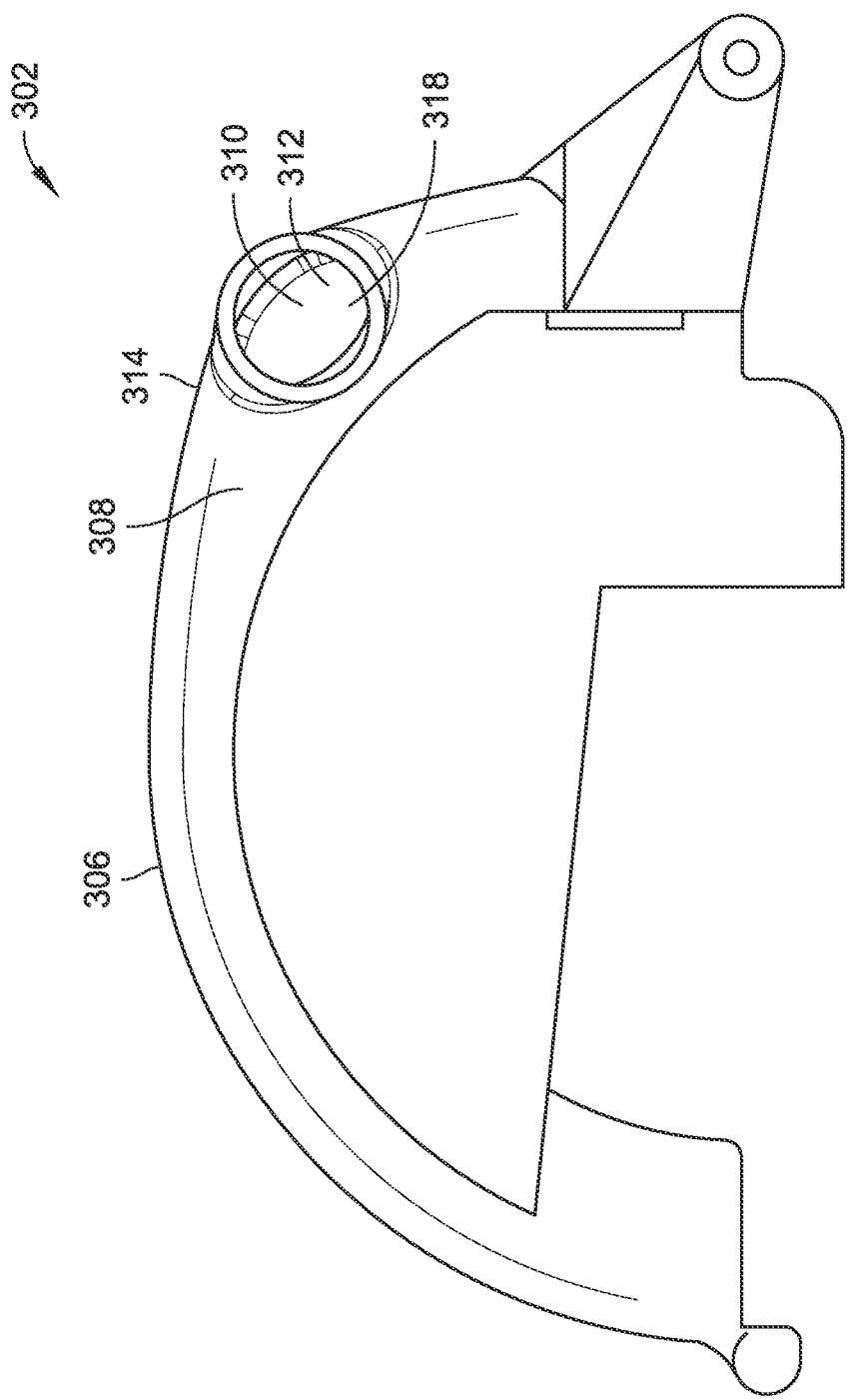
FIG. 27 is another side elevation view of the fixed blade guard illustrated in FIG. 24.
Figure 28:
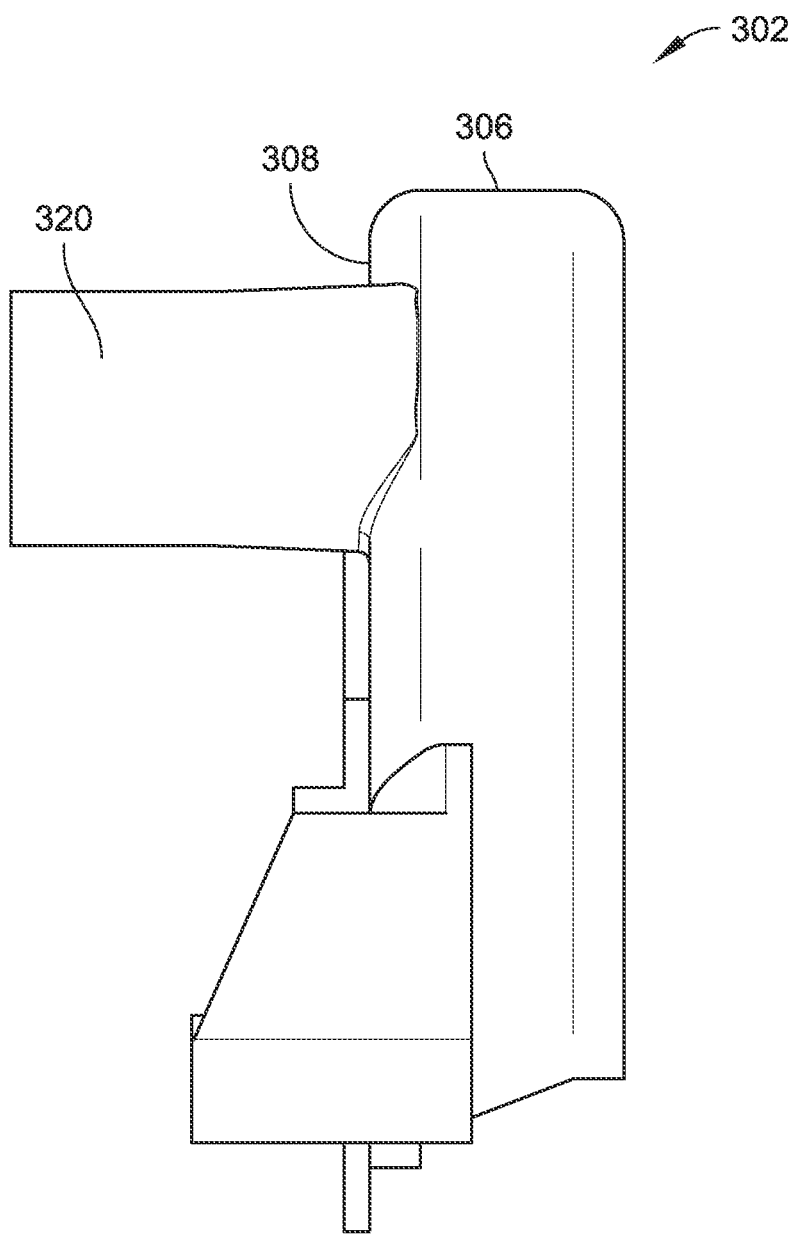
FIG. 28 is a front elevation view of the fixed blade guard illustrated in FIG. 24.
Figure 29:
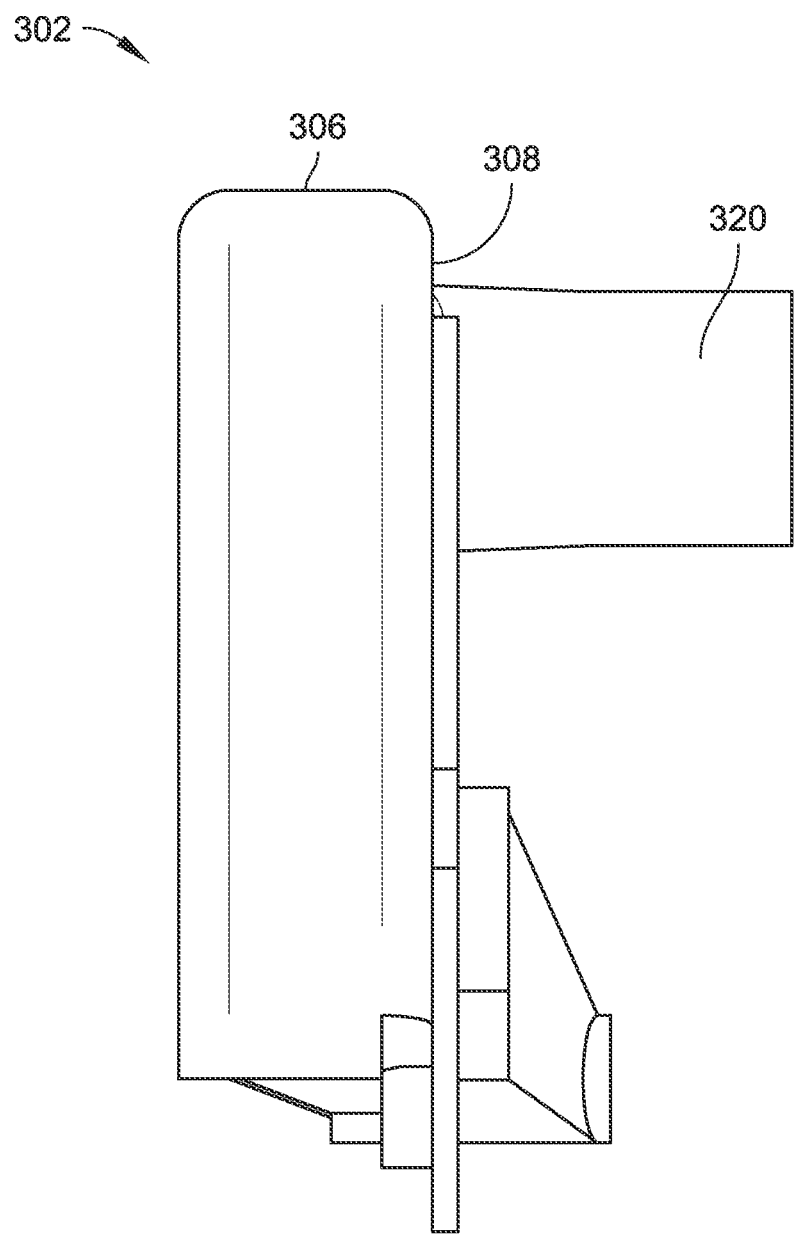
FIG. 29 is a rear elevation view of the fixed blade guard illustrated in FIG. 24.
Figure 30:
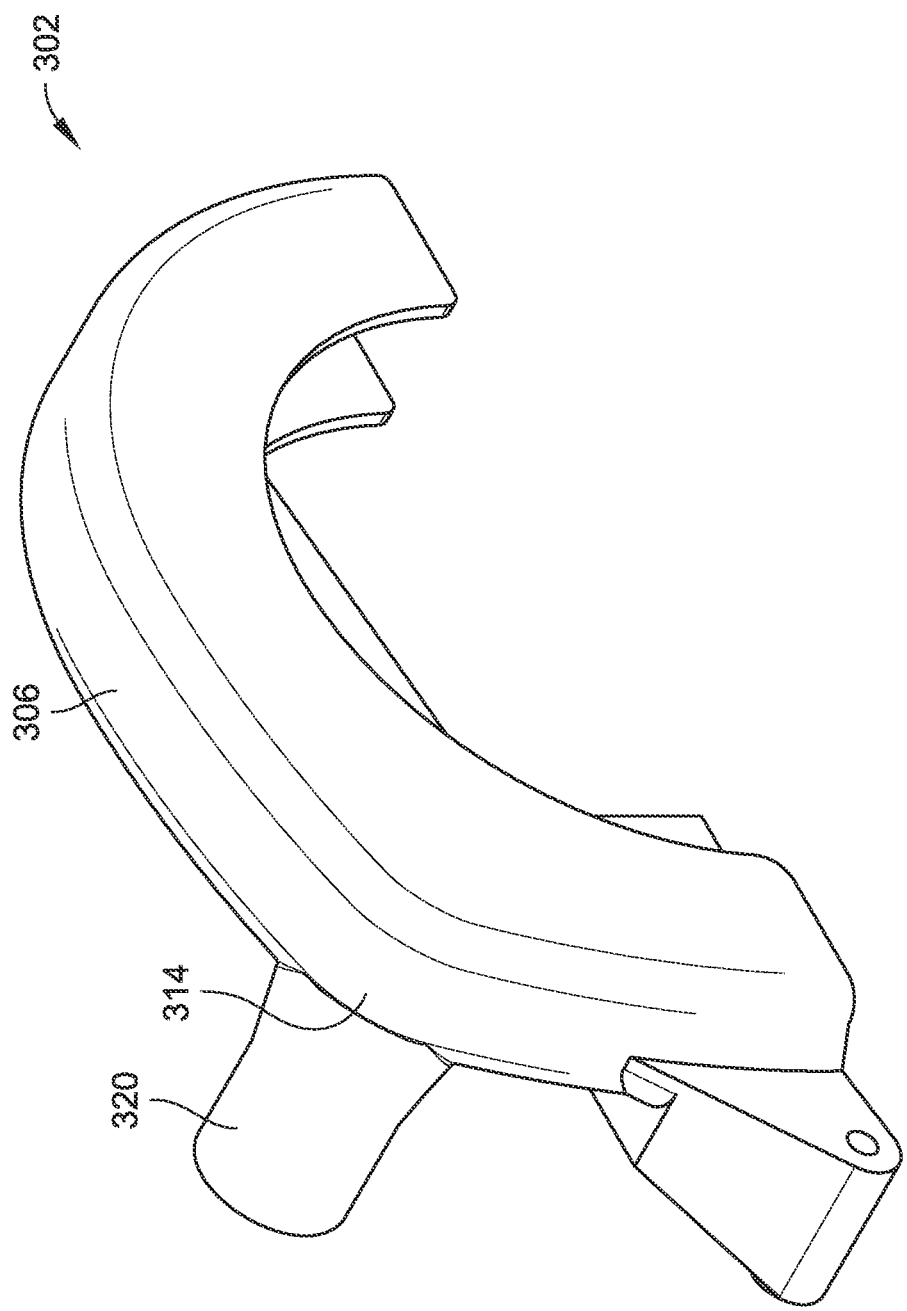
FIG. 30 is an isometric view of the fixed blade guard illustrated in FIG. 24.
Figure 31:
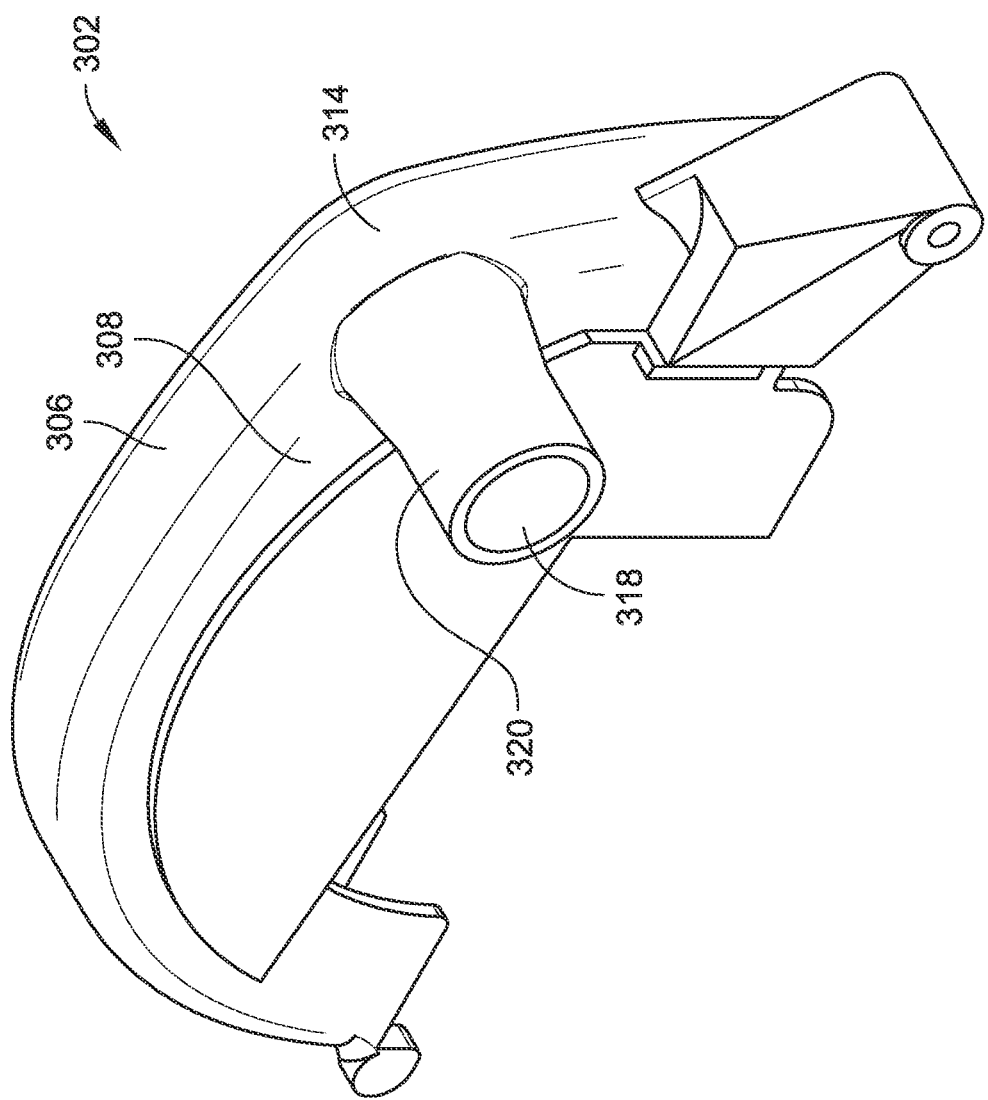
FIG. 31 is another isometric view of the fixed blade guard illustrated in FIG. 24.

Referring now to FIGS. 18 through 31, a dust collection system 300 can include a fixed blade guard 302 for a worm-drive circular saw 100. The fixed blade guard 302 can be positioned immediately adjacent to the motor 106 on one side of the blade 102, while mounting hardware for allowing the angle of the blade 102 to be changed with respect to the base plate 110 may be immediately adjacent to the fixed blade guard 108 on the other side of the blade 102. The fixed blade guard 302 can define an interior 304 (FIGS. 21 and 22). In embodiments of the disclosure, the fixed blade guard 302 can be fixedly connected to the circular saw 100 using various mounting hardware (e.g., screws, bolts, rivets, etc.).

The fixed blade guard 302 may have an arcuate profile (e.g., an arcuate top profile 306). The fixed blade guard 302 includes a side 308 extending generally perpendicularly with respect to the arcuate top profile 306, and the fixed blade guard 302 defines an exhaust port 310 for removing debris (e.g., dust, chips) drawn into the fixed blade guard 302. In embodiments of the disclosure, the exhaust port 310 extends through the side 308 of the fixed blade guard 302 and into fluid communication with a cavity 312 defined by the fixed blade guard 302. The cavity 312 is formed by a protrusion 314 of the arcuate top profile 306, and the cavity 312 has an expanded interior volume 316 extending from and adjacent to the exhaust port 310. As described herein, the protrusion 314 of the arcuate top profile 306 can have a rounded profile configured to minimize obstruction of an operator's vision when using the circular saw 100.

In some embodiments, a dust collection system 300 may also include a channel 318 in fluid communication with the expanded interior volume 316 of the cavity 312 through the exhaust port 310, where the channel 318 is defined by a connection 320 configured for connecting to a vacuum source (not shown) for pulling debris from within the fixed blade guard 302 into the cavity 312 and through the exhaust port 310 and the channel 318 toward the vacuum source. The connection 320 can be configured (e.g., sized) for connecting to, for example, a one and one-quarter inch (1-¼") diameter tube of the vacuum source (e.g., a vacuum hose 126). However, other vacuum tube and/or hose diameters may also be used, including, but not necessarily limited to: three-quarters of an inch (¾") diameter hoses, one-inch (1") diameter hoses, and so forth. A vacuum hose 126 may be rigid and/or flexible.

In some embodiments, the connection 320 may transition from a generally elliptical profile 322 proximate to the guard portion of the fixed blade guard 302 to a generally circular profile 324 at the connection to the vacuum hose 126. A cap (not shown) may be placed on the connection 320 to block the flow of dust and debris from the exhaust port 310, e.g., when the connection 320 is not connected to a tube or hose. In some embodiments, the vacuum hose 126 can be sized to extend through the handle 114 and be positioned to one side of the handle 114 to minimized obstruction of an operator's grip on the handle 114. However, in other embodiments, one or more hooks and/or clips on a side of the circular saw 100 can be used to hold the vacuum hose 126 in place. Further, a coupling, such as a plastic ring or a looped metal strip attached to a side of the circular saw 100 may be used to hold the vacuum hose 126 in place. In some embodiments, the circular saw 100 may also include a hook, loop, clip, or another holder integrally formed as part of and/or connected to a handle 114 (e.g., to one side of the handle 114).

Without wishing to be bound by any particular theory or principle of operations, it is believed that the expansion of the expanded interior volume 316 adjacent to the exhaust port 310 creates additional volume where dust and debris may collect prior to being drawn into the channel 318 and the vacuum hose 126 through the exhaust port 310. This arrangement may thus reduce or minimize the flow of the dust and debris from out of the fixed blade guard 308 and into the surrounding environment, as more dust and debris is pulled into the vacuum hose 126. It should be noted that in other embodiments, the expanded interior volume 316 may extend in a direction toward the front of the circular saw 100, away from the front of the circular saw 100 (e.g., as described with reference to FIGS. 1 through 17), and so forth.

The dust collection system 300 may also include a blade guard extender (e.g. as described with reference to FIG. 1 through 17) or another tunnel extender disposed at an end 128 of the fixed blade guard 302 and configured to extend the interior 304 of the fixed blade guard 302 to enhance the pulling of the debris from within the fixed blade guard 302 into the cavity 312 of the fixed blade guard 302. Further, the end 128 of the fixed blade guard 302 may be extended closer to the base plate 110 and/or angled (e.g., in a similar manner as the blade guard extender 222).

In some embodiments, the dust collection system 300 can include a divider 324 disposed within the fixed blade guard 302 and extending from proximate to the exhaust port 310 in a direction away from the exhaust port 310 toward the front of the circular saw 100 to enhance the pulling of debris from within the fixed blade guard 302 into the cavity 312. The divider 324 can be configured to be out of the path of the moveable blade guard 112 as it rotates about the center of the blade 102. The divider 324 may extend from proximate to the front of the circular saw 100 and terminate proximate to the exhaust port 310 (e.g., as described with reference to FIGS. 21 and 22), and it may span the width between opposing sides of the fixed blade guard 302. In some embodiments, the divider 324 may extend to encompass both sides of the expanded interior volume 316 adjacent of the exhaust port 310. The divider may be integrally formed with the fixed blade guard 302 (e.g., molded, co-molded) and/or may be formed as a separate part (e.g., an insert) added to the fixed blade guard 302.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A worm-drive circular saw comprising:
   an arbor mount for receiving a circular saw blade;
   a motor mounted at least substantially perpendicular to the arbor;
   a fixed blade guard having an arcuate profile and a side extending at least substantially perpendicularly with respect to the arcuate profile on the same side of the circular saw blade as the motor, the fixed blade guard defining an exhaust port for removing debris drawn into the fixed blade guard, the exhaust port extending through the side of the fixed blade guard on the same side of the circular saw blade as the motor and into fluid communication with a cavity defined by the fixed blade guard, the cavity formed by a protrusion of the arcuate profile away from the arbor mount and the circular saw blade, the cavity having an expanded interior volume extending from and adjacent to the exhaust port; and
   a channel in fluid communication with the expanded interior volume of the cavity through the exhaust port, the channel defined by a connection extending at least substantially parallel to the arbor on the same side of the circular saw blade as the motor, the connection configured for connecting to a vacuum source for pulling debris from within the fixed blade guard into the cavity and through the exhaust port and the channel toward the vacuum source.

2. The worm-drive circular saw as recited in claim 1, further comprising a divider disposed within the fixed blade guard and extending from proximate to the exhaust port in a direction away from the exhaust port to enhance the pulling of the debris from within the fixed blade guard into the cavity.

3. The worm-drive circular saw as recited in claim 1, further comprising a tube of the vacuum source connected to the connection, the tube configured to extend through a handle of the worm-drive circular saw.

4. The worm-drive circular saw as recited in claim 1, wherein the protrusion has a rounded profile configured to minimize obstruction of an operator's vision when using the worm-drive circular saw.

5. The worm-drive circular saw as recited in claim 1, wherein the expanded interior volume adjacent to the exhaust port is configured to extend in a direction away from a front of the worm-drive circular saw.

6. The worm-drive circular saw as recited in claim 1, wherein the connection transitions from an at least substantially elliptical profile proximal to the fixed blade guard to an at least substantially circular profile distal to the fixed blade guard.

7. A worm-drive circular saw comprising:
   an arbor mount for receiving a circular saw blade;
   a motor mounted at least substantially perpendicular to the arbor;
   a fixed blade guard having an arcuate profile with opposing first and second ends and a side surface extending at least substantially perpendicularly with respect to the arcuate profile on the same side of the circular saw blade as the motor along a longitudinal axis of the fixed blade guard between the opposing first and second ends, the fixed blade guard defining an exhaust port for removing debris drawn into the fixed blade guard, the exhaust port extending through the side of the fixed blade guard on the same side of the circular saw blade as the motor and into fluid communication with a cavity defined by the fixed blade guard, the cavity extending between the opposing first and second ends and along the longitudinal axis of the fixed blade guard, the cavity formed by a protrusion of the arcuate profile away from the arbor mount and the circular saw blade, the cavity having an expanded interior volume extending from and adjacent to the exhaust port; and
   a channel in fluid communication with the expanded interior volume of the cavity through the exhaust port, the channel extending from the side surface at least substantially perpendicular to the longitudinal axis of the fixed blade guard, the channel defined by a connection extending at least substantially parallel to the arbor on the same side of the circular saw blade as the motor, the connection configured for connecting to a vacuum source for pulling debris from within the fixed blade guard into the cavity and through the exhaust port and the channel toward the vacuum source.

8. The worm-drive circular saw as recited in claim 7, further comprising a divider disposed within the fixed blade guard and extending from proximate to the exhaust port in a direction away from the exhaust port to enhance the pulling of the debris from within the fixed blade guard into the cavity.

9. The worm-drive circular saw as recited in claim 7, further comprising a tube of the vacuum source connected to the connection, the tube configured to extend through a handle of the worm-drive circular saw.

10. The worm-drive circular saw as recited in claim 7, wherein the protrusion has a rounded profile configured to minimize obstruction of an operator's vision when using the worm-drive circular saw.

11. The worm-drive circular saw as recited in claim 7, wherein the expanded interior volume adjacent to the exhaust port is configured to extend in a direction away from a front of the worm-drive circular saw.

12. The worm-drive circular saw as recited in claim 7, wherein the connection transitions from an at least substantially elliptical profile proximal to the fixed blade guard to an at least substantially circular profile distal to the fixed blade guard.

13. A worm-drive circular saw comprising:
   an arbor mount for receiving a circular saw blade;

a motor mounted at least substantially perpendicular to the arbor;

a fixed blade guard having an arcuate profile with opposing first and second ends and a side surface extending at least substantially perpendicularly with respect to the arcuate profile on the same side of the circular saw blade as the motor along a longitudinal axis of the fixed blade guard between the opposing first and second ends, the fixed blade guard defining an exhaust port for removing debris drawn into the fixed blade guard, the exhaust port extending through the side of the fixed blade guard on the same side of the circular saw blade as the motor and into fluid communication with a cavity defined by the fixed blade guard, the cavity extending between the opposing first and second ends and along the longitudinal axis of the fixed blade guard, the cavity formed by a protrusion of the arcuate profile away from the arbor mount and the circular saw blade, the cavity having an expanded interior volume extending from and adjacent to the exhaust port;

a channel in fluid communication with the expanded interior volume of the cavity through the exhaust port, the channel extending from the side surface at least substantially perpendicular to the longitudinal axis of the fixed blade guard, the channel defined by a connection extending at least substantially parallel to the arbor on the same side of the circular saw blade as the motor, the connection configured for connecting to a vacuum source for pulling debris from within the fixed blade guard into the cavity and through the exhaust port and the channel toward the vacuum source; and a divider disposed within the fixed blade guard and extending from proximate to the exhaust port in a direction away from the exhaust port to enhance the pulling of the debris from within the fixed blade guard into the cavity.

14. The worm-drive circular saw as recited in claim 13, further comprising a tube of the vacuum source connected to the connection, the tube configured to extend through a handle of the worm-drive circular saw.

15. The worm-drive circular saw as recited in claim 13, wherein the protrusion has a rounded profile configured to minimize obstruction of an operator's vision when using the worm-drive circular saw.

16. The worm-drive circular saw as recited in claim 13, wherein the expanded interior volume adjacent to the exhaust port is configured to extend in a direction away from a front of the worm-drive circular saw.

17. The worm-drive circular saw as recited in claim 13, wherein the connection transitions from an at least substantially elliptical profile proximal to the fixed blade guard to an at least substantially circular profile distal to the fixed blade guard.

* * * * *